United States Patent
Kawana

(10) Patent No.: US 9,323,033 B2
(45) Date of Patent: Apr. 26, 2016

(54) ZOOM LENS AND IMAGING APPARATUS

(71) Applicant: FUJIFILM Corporation, Tokyo (JP)

(72) Inventor: Masanao Kawana, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/598,521

(22) Filed: Jan. 16, 2015

(65) Prior Publication Data

US 2015/0198792 A1 Jul. 16, 2015

(30) Foreign Application Priority Data

Jan. 16, 2014 (JP) ................................. 2014-005650
Sep. 11, 2014 (JP) ................................. 2014-184967

(51) Int. Cl.
| | |
|---|---|
| G02B 15/14 | (2006.01) |
| G02B 15/167 | (2006.01) |
| G02B 27/64 | (2006.01) |
| G02B 15/17 | (2006.01) |
| G02B 15/173 | (2006.01) |

(52) U.S. Cl.
CPC .............. G02B 15/167 (2013.01); G02B 15/17 (2013.01); G02B 15/173 (2013.01); G02B 27/646 (2013.01)

(58) Field of Classification Search
CPC .. G02B 13/16; G02B 13/0045; G02B 13/009; G02B 15/177; G02B 15/173; G02B 15/14; G02B 15/28; G02B 15/167; G02B 27/646; G02B 15/22
USPC .................................................. 359/638–687
See application file for complete search history.

(56) References Cited

U.S. PATENT DOCUMENTS 7,221,511 B2    5/2007  Toyama
2011/0273776 A1*  11/2011  Obama ................ G02B 15/173
                                                 359/687

FOREIGN PATENT DOCUMENTS

JP    2007-010903    1/2007
JP    2013-037063    2/2013

OTHER PUBLICATIONS

DE Search report, dated Jul. 8, 2015; Application No. 10 2015 100 582.4.

* cited by examiner

*Primary Examiner* — Euncha Cherry
(74) *Attorney, Agent, or Firm* — Young & Thompson

(57) ABSTRACT

The zoom lens consists essentially of a positive first lens group, a negative second lens group, an aperture stop, a third lens group, a positive fourth lens group and a fifth lens group in this order from the object side. The first, third, and fifth lens groups are fixed while the second and the fourth lens groups move when changing magnification from the wide angle end to the telephoto end, and the fourth lens group moves when focusing is performed. The fifth lens group consists essentially only of a single cemented lens having a meniscus shape with a convex surface toward the image side, and conditional formulas (1), (2) are satisfied when the maximum image height is Y, the air equivalent back focus is Bf and the distance along the optical axis from the aperture stop to the peak of the most-image-side lens surface is Lsr:

$$0.05 < Y/Bf < 0.20 \qquad (1)$$

$$1.8 < Lsr/Bf < 3.5 \qquad (2).$$

20 Claims, 14 Drawing Sheets

EXAMPLE 1

WIDE ANGLE END

INTERMEDIATE

TELEPHOTO END

WIDE ANGLE END     EXAMPLE 1

INTERMEDIATE

TELEPHOTO END

WIDE ANGLE END     EXAMPLE 2

INTERMEDIATE

TELEPHOTO END

WIDE ANGLE END — EXAMPLE 3

INTERMEDIATE

TELEPHOTO END

EXAMPLE 4

WIDE ANGLE END

INTERMEDIATE

TELEPHOTO END

WIDE ANGLE END — EXAMPLE 5

INTERMEDIATE

TELEPHOTO END

WIDE ANGLE END — EXAMPLE 6

INTERMEDIATE

TELEPHOTO END

EXAMPLE 3

WIDE ANGLE END

INTERMEDIATE

TELEPHOTO END

EXAMPLE 4

EXAMPLE 5

EXAMPLE 6

ZOOM LENS AND IMAGING APPARATUS

CROSS-REFERENCE TO RELATED APPLICATIONS

The present application claims priorities under 35 U.S.C. §119 to Japanese Patent Application No. 2014-005650, filed on Jan. 16, 2014 and Japanese Patent Application No. 2014-184967, filed on Sep. 11, 2014. Each of the above application(s) is hereby expressly incorporated by reference, in its entirety, into the present application.

BACKGROUND OF THE INVENTION

1. Field of the Invention

The present invention relates to a zoom lens and an imaging apparatus, and more particularly to a zoom lens that can be used for an electronic camera such as a digital camera, a video camera, a broadcasting camera, a movie camera, a surveillance camera, and the like as well as an imaging apparatus mounted with this zoom lens.

2. Description of the Related Art

Conventionally, zoom lenses, which consist of a first lens group having a positive refractive power, a second lens group having a negative refractive power, a third lens group having a positive or negative refractive power, a fourth lens group having a positive refractive power, and a fifth lens group having a positive or negative refractive power in this order from the object side, in which the first, third, and fifth lens groups are fixed while the second and fourth lens groups are configured to move when changing magnification, are known as zoom lenses to be mounted onto a TV camera in the field described above.

In zoom lenses having such a configuration, lens groups which move for focusing can be reduced in size and weight, AF (autofocus) is easily attained, and a configuration, in which the total length is fixed, is possible even in the case that the magnification ratio is set to be greater. For example, the zoom lenses disclosed in Patent Documents 1 and 2 (Japanese Unexamined Patent Publication No. 2007-010903 and Japanese Unexamined Patent Publication No. 2013-037063) are known as this type of zoom lens.

SUMMARY OF THE INVENTION

However, the zoom ratio of the zoom lens disclosed in Patent Document 1 is around 10×. Further, the zoom lens disclosed in Patent Document 2 has a short back focus so that the zoom lens is not suitable for the imaging apparatuses that utilize a color separation prism, for example.

The present invention has been developed in view of the above circumstances, and it is an object of the present invention to provide a zoom lens capable of securing both a high zoom ratio of approximately 20× and sufficient amount of back focus, and to provide an imaging apparatus equipped with such a zoom lens.

A zoom lens of the present invention consists essentially of a first lens group having a positive refractive power, a second lens group having a negative refractive power, an aperture stop, a third lens group, a fourth lens group having a positive refractive power, and a fifth lens group in this order from the object side, wherein the first, third, and fifth lens groups are fixed while the second and fourth lens groups move when changing magnification;

the fourth lens group moves when focusing;

the fifth lens group consists essentially only of a single cemented lens which has a meniscus shape with a convex surface toward the image side;

the refractive index of a medium which constitutes the object-side lens of the cemented lens is greater than that of the image-side lens of the cemented lens; and the zoom lens satisfies conditional formulas (1) and (2) below:

$$0.05 < Y/Bf < 0.20 \quad (1)$$

$$1.8 < Lsr/Bf < 3.5 \quad (2),$$ where

Y: the maximum image height,
Bf: the air equivalent back focus, and
Lsr: the distance along the optical axis from the aperture stop to the peak of the most-image-side lens surface.

Note that it is more preferable for the conditions (the equations), the numerical ranges of which are respectively defined by conditional formulas (1) and (2), to satisfy either or both of conditional formulas (1') and (2') below:

$$0.08 < Y/Bf < 0.18 \quad (1')$$

$$1.9 < Lsr/Bf < 3.0 \quad (2').$$

It is desirable for the zoom lens of the present invention to satisfy conditional formula (3) below:

$$2.0 < |f12w/fw| < 4.0 \quad (3),$$ where f12w: the combined focal length of the first lens group and the second lens group at the wide angle end, and
fw: the focal length of the entire system at the wide angle end.

Note that it is more preferable for the condition, the numerical range of which is defined by conditional formula (3) above, to satisfy conditional formula (3') below:

$$2.2 < |f12w/fw| < 3.5 \quad (3').$$

Further, it is desirable for the zoom lens of the present invention to satisfy conditional formula (4) below:

$$5.8 < |f1/f2| < 8.0 \quad (4),$$ where f1: the focal length of the first lens group, and
f2: the focal length of the second lens group.

Note that it is more preferable for the condition, the numerical range of which is defined by conditional formula (4) above, to satisfy conditional formula (4') below:

$$6.0 < |f1/f2| < 7.0 \quad (4').$$

Further, in the zoom lens of the present invention, it is desirable for the first, second, and third lens groups to have a negative refractive power as a whole.

It is desirable for the zoom lens of the present invention to satisfy conditional formula (5) below:

$$7.0 < Mz/fw < 11.0 \quad (5),$$ where

Mz: the amount of movement of the second lens group when changing magnification from the wide angle end to the telephoto end, and
fw: the focal length of the entire system at the wide angle end.

It is desirable for the condition, the numerical range of which is defined by conditional formula (5) above, to satisfy conditional formula (5') below and more preferably conditional formula (5") below:

$$7.0 < Mz/fw < 10.5 \quad (5')$$

$$8.5 < Mz/fw < 10.5 \quad (5").$$

It is desirable for the zoom lens of the present invention to satisfy conditional formula (6) below:

$$10.0 < Lfs/fw < 25.0 \qquad (6),$$ where

Lfs: the distance along the optical axis from the peak of the most-object-side lens surface to the aperture stop, and
fw: the focal length of the entire system at the wide angle end.

It is more preferable for the condition, the numerical range of which is defined by conditional formula (6) above, to satisfy conditional formula (6') below:

$$15.0 < Lfs/fw < 20.0 \qquad (6').$$

In the zoom lens of the present invention, it is preferable for the air space formed by a convex surface and a concave surface facing each other and a joint surface to be provided within the interior of the second lens group, and for conditional formula (7) below to be satisfied:

$$2.0 < |(Rz1+Rz2)/(Rz1-Rz2)| < 4.5 \qquad (7),$$ where

Rz1, Rz2: the radii of curvature of one and the other of the convex surface and the concave surface above.

Note that it is more preferable for the condition, the numerical range of which is defined by conditional formula (7) above, to satisfy conditional formula (7') below:

$$2.5 < |(Rz1+Rz2)/(Rz1-Rz2)| < 4.0 \qquad (7').$$

Further, in the zoom lens of the present invention, it is desirable for the first lens group to consist essentially of a lens having a negative refractive power, a lens having a positive refractive power which is cemented to this negative lens together, another lens having a positive refractive power, and still another lens having a positive refractive power in this order from the object side.

Further, in the zoom lens of the present invention, it is desirable for the third lens group to consist essentially of a third-a lens group, which is fixed when correcting camera shake; a third-b lens group having a positive refractive power, which is capable of shifting an image on the image formation plane by moving in a direction that intersects the optical axis when correcting camera shake; and a third-c lens group having a negative refractive power, which is fixed when correcting camera shake in this order from the object side.

Note that it is desirable for the third-a lens group above to include a cemented lens.

Further, it is desirable for the third-b lens group above to consist essentially of a cemented lens formed by cementing a lens having a positive refractive power and a lens having a negative refractive power together, and for the Abbe number of the medium of the lens having a positive refractive power above to be greater than that of the medium of the lens having a negative refractive power above.

Alternatively, it is also desirable for the third-b lens group above to consist essentially of a meniscus lens having a negative refractive power with a concave surface toward the object side and a lens having a positive refractive power in this order from the object side, and for the Abbe number of the medium of the lens having a positive refractive power above to be greater than that of the medium of the lens having a negative refractive power above.

Further, in the zoom lens of the present invention, it is desirable for the fourth lens group to include a cemented lens formed by cementing a lens having a positive refractive power and a lens having a negative refractive power together, and for the Abbe number of the medium of the lens having a positive refractive power above to be greater than that of the medium of the lens having a negative refractive power above.

In the case that the fourth lens group is configured in such a manner as described above, it is desirable for the fourth lens group to consist essentially of a lens having a positive refractive power; a lens having a negative refractive power, which is cemented to this positive lens together, and another lens having a positive refractive power and including an aspherical surface in this order from the object side.

Here, the term "essentially" of the above expression "consists essentially of . . ." intends to mean that lenses substantially without any refractive power; optical elements other than lenses such as stops, cover glasses, filters and the like; lens flanges; lens barrels; image sensors; and mechanical parts such as image stabilization mechanisms, and the like may be included in addition to the constituent elements listed above.

Note that each of the lens groups is not necessarily constituted by a plurality of lenses, and also includes that constituted by a single lens.

The signs of refractive powers above and surface shapes of lenses should be considered in the paraxial region with respect to lenses including aspherical surfaces.

Further, each focal length which is used in each conditional formula above is for the lens arrangement when the entire system is focused on the object at infinity. Meanwhile, an imaging apparatus according to the present invention is equipped with the zoom lens of the present invention described above.

The zoom lens of the present invention consists essentially of a first lens group having a positive refractive power; a second lens group having a negative refractive power; an aperture stop; a third lens group; a fourth lens group having a positive refractive power; and a fifth lens group in this order from the object side along the optical axis Z. Further, in the zoom lens of the present invention, the first, third, and fifth lens groups are fixed while the second and the fourth lens groups move when changing magnification from the wide angle end to the telephoto end, and focusing is performed by the fourth lens group moving. This facilitates attaining AF (autofocus) and enables a configuration in which the total length is fixed even in the case that the magnification ratio is set to be greater.

Further, as the fifth lens group consists only of a single cemented lens and has a meniscus shape with a convex surface toward the image side as a whole, the outer diameters of the lenses in the fourth lens group which is a focusing group can be suppressed to reduce the weight thereof. This makes it easy to design a driving system for focusing.

Further, in the cemented lens above, the refractive index of the medium which constitutes the concave-surface-side lens of the joint surface is configured to be greater than that of the medium which constitutes the convex-surface-side lens. Thereby, the joint surface of the cemented lens operates to diffuse the axial luminous flux. This will be advantageous from the viewpoint of correcting spherical aberration.

Further, the zoom lens of the present invention is configured to satisfy conditional formulas (1) and (2):

$$0.05 < Y/Bf < 0.20 \qquad (1)$$

$$1.8 < Lsr/Bf < 3.5 \qquad (2),$$ where

Y: the maximum image height,
Bf: the air equivalent back focus, and
Lsr: the distance along the optical axis from the aperture stop to the peak of the most-image-side lens surface.

This avoids an increase in the size, enables an appropriate amount of back focus to be secured and the fluctuations in chromatic aberrations to be reduced. Note that the reason therefor will be described in detail in accordance with the embodiments later.

An imaging apparatus of the present invention is provided with the zoom lens of the present invention. Therefore, a compact configuration can be attained and favorable images can be obtained.

DESCRIPTION OF THE PREFERRED EMBODIMENTS

Figure 1:
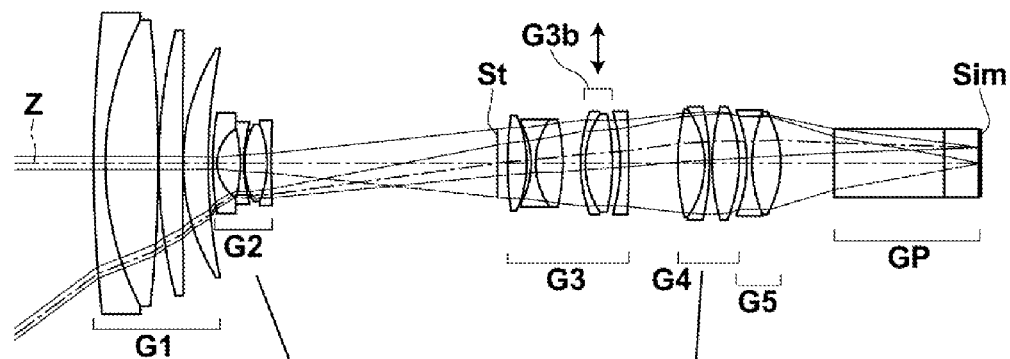
FIG. 1 is a cross-sectional view illustrating the lens configuration of an imaging lens according to one embodiment of the present invention.
Figure 1:
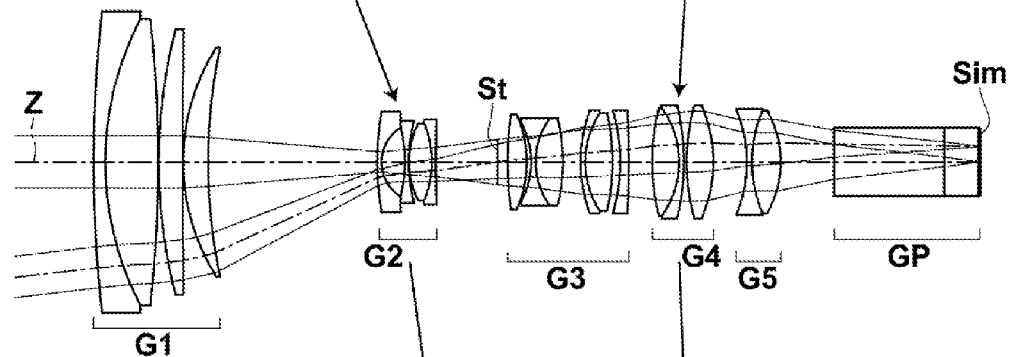
Figure 1:
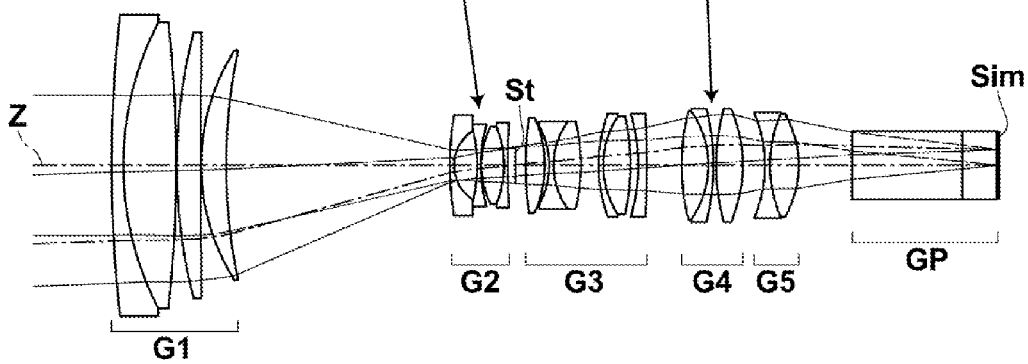

Hereinafter, embodiments of the present invention will be described in detail with reference to the accompanying drawings. FIG. 1 is a cross-sectional view illustrating the lens configuration of an imaging lens according to one embodiment of the present invention with optical paths. The example shown in FIG. 1 corresponds to Example 1 to be described later. In this FIG. 1, the upper stage, the middle stage, and the lower stage respectively shows the state in the wide angle end, that in the intermediate position (the intermediate focal length position), and that in the telephoto end. The movement trajectories of the lens groups are shown by the arrows between these states. In FIG. 1, the left side is the object side, and the right side is the image side. Further, the state in which the zoom lens is focused on the object at infinity is shown.

Note that when this zoom lens is applied to an imaging apparatus, it is preferable for a cover glass which covers the imaging surface of the image sensor, a color separation prism according to the specification of the imaging apparatus, various types of filters, such as an infrared cut filter, a low-pass filter, and the like to be provided between the optical system and the imaging plane Sim. FIG. 1 illustrates an example in which a plane parallel optical member GP that presumes such elements is provided between the lens system and an imaging plane Sim. However, the optical member GP is not an essential constituent element for the zoom lens of the present invention.

The zoom lens of the present embodiment consists of a first lens group G1 having a positive refractive power, a second lens group G2 having a negative refractive power, an aperture stop St, a third lens group G3, a fourth lens group G4 having a positive refractive power, and a fifth lens group G5. Note that the aperture stop St shown in FIG. 1 does not necessarily represent the size or shape thereof, but the position thereof on the optical axis Z.

The present zoom lens is configured in such a manner that the first lens group G1, the third lens group G3, and the fifth lens group G5 are fixed with respect to the imaging plane Sim; the second lens group G2 monotonously moves from the object side to the image side along the optical axis Z; and the fourth lens group G4 moves along the optical axis Z to correct variations in the imaging plane due to changes in magnification when changing magnification from the wide angle end to the telephoto end. That is, in the present zoom lens, the second lens group G2 functions as a variator group, and the fourth lens group G4 functions as a compensator group. In FIG. 1, the movement trajectories of each of the second lens group G2 and the fourth lens group G4 are schematically shown by the arrows under each lens group for when changing magnification from the wide angle end to the intermediate position and for when changing magnification from the intermediate position to the telephoto end.

In the present zoom lens, focusing is performed by the fourth lens group G4 moving along the optical axis Z.

Configuring the present zoom lens in such a manner as described above facilitates achieving AF (autofocus) and enables a configuration in which the total length is fixed even in the case that the magnification ratio is set to be greater.

Further, the fifth lens group G5 consists only of a single cemented lens having a meniscus shape with a convex surface toward the image side. Thereby, the outer diameters of the lenses in the fourth lens group G4 which is a focusing group can be suppressed to reduce the weight thereof. This makes it easy to design a driving system for focusing.

Figure 2:
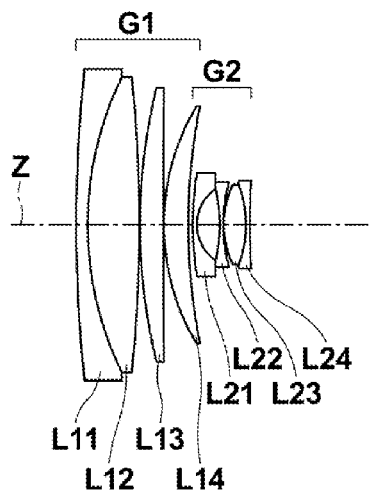
FIG. 2 is a cross-sectional view illustrating the lens configuration of an imaging lens of Example 1 of the present invention.
Figure 2:
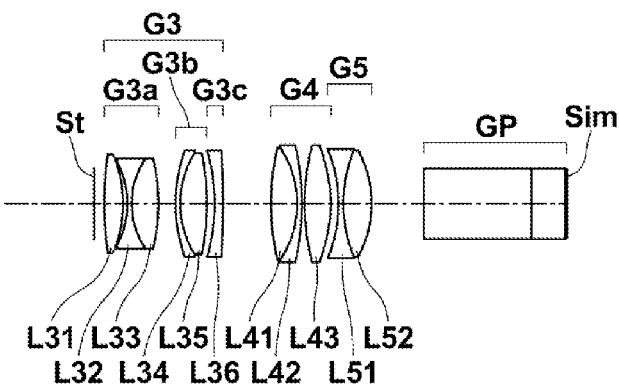
Figure 2:
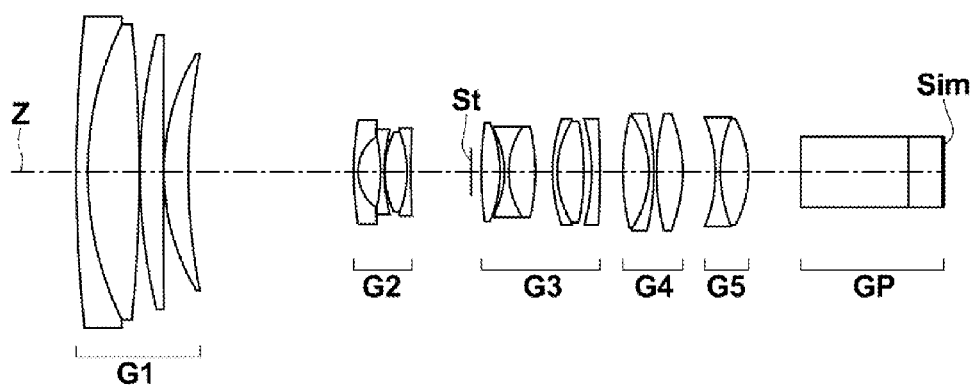
Figure 2:
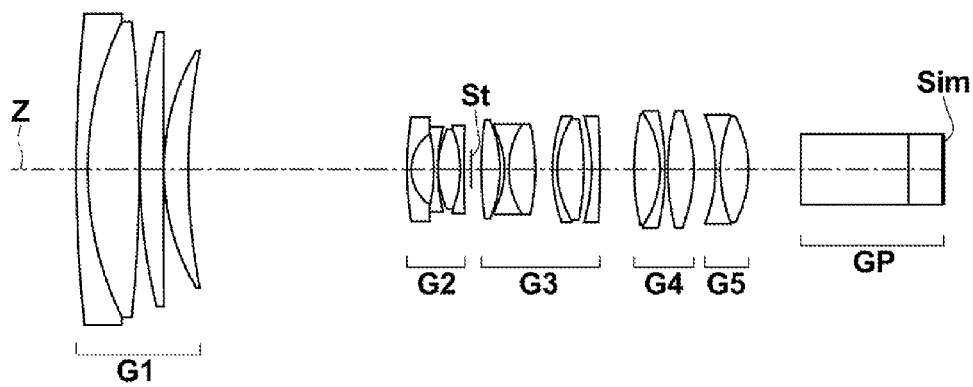

In the cemented lens above, the refractive index of the medium which constitutes the concave-surface-side lens (a lens L51 in FIG. 2 to be described later) of the joint surface is configured to be greater than that of the medium which constitutes the convex-surface-side lens (a lens L52 in FIG. 2). Thereby, the joint surface of the cemented lens operates to diffuse the axial luminous flux. This will be advantageous from the viewpoint of correcting spherical aberration.

Further, the present zoom lens is configured to satisfy conditional formulas (1) and (2):

$$0.05 < Y/Bf < 0.20 \tag{1}$$

$$1.8 < Lsr/Bf < 3.5 \tag{2}$$

where

Y: the maximum image height,
Bf: the air equivalent back focus, and
Lsr: the distance along the optical axis from the aperture stop St to the peak of the most-image-side lens surface.

Note that the peak of the lens surface described above refers to the peak of the image-side surface of the most-image-side lens of the fifth lens group G5.

Table 19 to be described later shows a collection of the values of the conditions (the equations), the numerical ranges of which are respectively defined by conditional formulas (1) through (7) is shown for each Example. As shown therein, in Example 1, the specific values of Y/Bf and Lsr/Bf are respectively 0.11 and 2.01.

In general, the maximum image height Y is given as a predetermined value according to the size of an image sensor applied for use in an imaging apparatus in the design of the zoom lens for an imaging apparatus. On the presumption that the maximum image height Y is predetermined in such a manner, setting the value of Y/Bf to a degree that exceeds the lower limit defined by conditional formula (1) can avoid an increase in the size of the lens system. Further, setting the value of Y/Bf to a degree that falls below the upper limit defined by conditional formula (1) can secure an appropriate amount of back focus Bf. That is, if the back focus Bf is great to a degree that the value of Y/Bf is lower than or equal to the lower limit defined by conditional formula (1), the lens system will be enlarged. In contrast, in the case that the value of Y/Bf is greater than or equal to the upper limit defined by conditional formula (1), securing an appropriate back focus Bf will be difficult. The advantageous effect as described above can be exhibited without causing such shortcomings if conditional formula (1) is satisfied.

The advantageous effect described above will be prominent in the case that conditional formula (1') below with respect to the value of Y/Bf is satisfied:

$$0.08 < Y/Bf < 0.18 \quad (1).$$

In contrast, on the presumption that the back focus Bf is limited to a relatively narrow range in advance, setting the value of Lsr/Bf to a degree that exceeds the lower limit defined by conditional formula (2) can reduce the fluctuations in chromatic aberration. Further, setting the value of Lsr/Bf to a degree that falls below the upper limit defined by conditional formula (2) can avoid the increase in the size of the lens system. That is, if the distance Lsr is short to a degree that the value of Lsr/Bf is lower than or equal to the lower limit defined by conditional formula (2), the fluctuations in chromatic aberration will be increased. In contrast, in the case that the value of Lsr/Bf is greater than or equal to the upper limit defined by conditional formula (2), the lens system will be enlarged. However, the advantageous effect as described above can be exhibited without causing such shortcomings if conditional formula (2) is satisfied.

The advantageous effect described above will be prominent in the case that conditional formula (2') below with respect to the value of Lsr/Bf is satisfied:

$$1.9 < Lsr/Bf < 3.0 \quad (2').$$

Further, in the zoom lens of the present embodiment, conditional formula (3) below is satisfied:

$$2.0 < |f12w/fw| < 4.0 \quad (3), \text{ where}$$

f12w: the combined focal length of the first lens group G1 and the second lens group G2 at the wide angle end, and
fw: the focal length of the entire system at the wide angle end.
As shown in Table 19, in Example 1, the specific value of |f12w/fw| is 2.80.

Setting the value of |f12w/fw| to a degree that exceeds the lower limit defined by conditional formula (3) facilitates correcting various types of aberrations. Setting the value of |f12w/fw| to a degree that falls below the upper limit defined by conditional formula (3) facilitates widening the angle of view. That is, if the value of |f12w/fw| is small to a degree that is lower than or equal to the lower limit defined by conditional formula (3), a negative refractive power of the front group (the first lens group G1 and the second lens group G2) will excessively increase, resulting in correction of various types of aberration becoming difficult. In contrast, if the value of |f12w/fw| is great to a degree that is greater than or equal to the upper limit defined by conditional formula (3), widening the angle of view will become difficult. However, the advantageous effect as described above can be exhibited without causing such shortcomings if conditional formula (3) is satisfied.

The advantageous effect described above will be prominent in the case that conditional formula (3') below with respect to the value of |f12w/fw| is satisfied:

$$2.2 < |f12w/fw| < 3.5 \quad (3').$$

Further, in the zoom lens of the present embodiment, conditional formula (4) below is satisfied:

$$5.8 < |f1/f2| < 8.0 \quad (4), \text{ where}$$

f1: the focal length of the first lens group G1, and
f2: the focal length of the second lens group G2.
As shown in Table 19, in Example 1, the specific value of |f1/f2| is 6.68.

Setting the value of |f1/f2| to a degree that exceeds the lower limit defined by conditional formula (4) can make it easy to correct spherical aberration and longitudinal chromatic aberration in the vicinity of the telephoto end. Further, setting the value of |f1/f2| to a degree that falls below the upper limit defined by conditional formula (4) can avoid the increase in the size of the lens system. That is, if the value of |f1/f2| is small to a degree that is smaller than or equal to the lower limit defined by conditional formula (4), the fluctuations in spherical aberration and longitudinal chromatic aberration in the vicinity of the telephoto end will increase. In contrast, if the value of |f1/f2| is great to a degree that is greater than or equal to the upper limit defined by conditional formula (4), the size of the lens system will increase. However, the advantageous effect as described above can be exhibited without causing such shortcomings if conditional formula (4) is satisfied.

The advantageous effect described above will be prominent in the case that conditional formula (4') below with respect to the value of |f1/f2| is satisfied:

$$6.0 < |f1/f2| < 7.0 \quad (4').$$

In the zoom lens of the present embodiment, the first lens group G1, the second lens group G2, and the third lens group G3 have a negative refractive power as a whole.

In the zoom lens of the present embodiment, conditional formula (5) below is satisfied:

$$7.0 < Mz/fw < 11.0 \quad (5), \text{ where}$$

Mz: the amount of movement of the second lens group G2 when changing magnification from the wide angle end to the telephoto end, and
fw: the focal length of the entire system at the wide angle end.
As shown in Table 19, in Example 1, the specific value of Mz/fw is 9.82.

Setting the value of Mz/fw to a degree that exceeds the lower limit defined by conditional formula (5) facilitates achieving a higher zoom ratio. Setting the value of Mz/fw to a degree that falls below the upper limit defined by conditional formula (5) can avoid increasing the size of the lens system. That is, if the value of Mz/fw is small to a degree that is lower than or equal to the lower limit defined by conditional formula (5), it will be difficult to have a higher zoom ratio. In contrast, if the value of Mz/fw is great to a degree that is lower than or equal to the lower limit defined by conditional formula (5), the size of the lens system will increase. However, the advantageous effect as described above can be exhibited without causing such shortcomings if conditional formula (5) is satisfied.

The advantageous effect described above will be prominent in the case that conditional formula (5') below with respect to the value of Mz/fw is satisfied, and will be more prominent in the case that conditional formula (5") is satisfied:

$$7.0 < Mz/fw < 10.5 \quad (5')$$

$$8.5 < Mz/fw < 10.5 \quad (5'').$$

The zoom lens of the present embodiment satisfies conditional formula (6) below:

$$10.0 < Lfs/fw < 25.0 \quad (6), \text{ where}$$

Lfs: the distance along the optical axis from the peak of the most-object-side lens surface to the aperture stop, and
fw: the focal length of the entire system at the wide angle end.
Note that the peak of the lens surface above corresponds to the peak of the object-side surface of the most-object-side lens in the first lens group G1. As shown in Table 19, in Example 1, the specific value of Lfs/fw is 18.1.

Setting the value of Lfs/fw to a degree that exceeds the lower limit defined by conditional formula (6) facilitates widening the angle of view. Setting the value of Lfs/fw to a degree that falls below the upper limit defined by conditional formula (6) can avoid increasing the size of the front lens groups (which are lens groups G1 and G2 disposed toward the object side from the aperture stop St). That is, if the value of Lfs/fw is small to a degree that is lower than or equal to the lower limit defined by conditional formula (6), widening the angle of view will be difficult. In contrast, if the value of Lfs/fw is great to a degree that is greater than or equal to the upper limit defined by conditional formula (6), the size of the front lens group will increase. However, the advantageous effect as described above can be exhibited without causing such shortcomings if conditional formula (6) is satisfied.

The advantageous effect described above will be prominent in the case that conditional formula (6') below with respect to the value of Lfs/fw is satisfied:

$$15.0 < Lfs/fw < 20.0 \quad (6').$$

In the zoom lens of the present embodiment, the air space formed by a convex surface and a concave surface facing each other and a joint surface are provided within the interior of the second lens group, and conditional formula (7) below is satisfied:

$$2.0 < |(Rz1+Rz2)/(Rz1-Rz2)| < 4.5 \quad (7), \text{ where}$$

Rz1, Rz2: the radii of curvature of one and the other of the convex surface and the concave surface above. As shown in Table 19, in Example 1, the specific value of |(Rz1+Rz2)/(Rz1−Rz2)| is 3.44.

Note that in the present embodiment, the air space above is provided between lenses which are respectively first and second from the object side in the second lens group G2, and the joint surface above is formed by cementing lenses which are respectively third and fourth from the object side in the second lens group G2 together.

Such a joint surface as described above enables field curvature and chromatic aberration to be corrected.

Further, setting the value of |(Rz1+Rz2)/(Rz1−Rz2)| in such a manner that conditional formula (7) is satisfied can reduce the fluctuations in astigmatism due to changes in magnification.

The advantageous effect described above will be prominent in the case that conditional formula (7') below with respect to the value of |(Rz1+Rz2)/(Rz1−Rz2)| is satisfied:

$$2.5 < |(Rz1+Rz2)/(Rz1-Rz2)| < 4.0 \quad (7').$$

Next, specific Examples of the zoom lens according to the present invention will be described.

EXAMPLE 1

FIG. 2 shows a cross-sectional view illustrating the lens configuration of an imaging lens of Example 1. In this FIG. 2, the upper stage, the middle stage, and the lower stage respectively shows the arrangement and configuration of each lens group in the wide angle end, those in the intermediate position (the intermediate focal length position), and those in the telephoto end. In FIG. 2, the left side is the object side, and the right side is the image side. Further, the state in which the zoom lens is focused on the object at infinity is shown. FIG. 2 also shows the example in which the optical member GP as described above is disposed between the lens system and the imaging plane Sim.

The schematic configuration of the zoom lens in Example 1 is as described below. This zoom lens is constituted by a first lens group G1 having a positive refractive power, a second lens group G2 having a negative refractive power, an aperture stop St, a third lens group G3, a fourth lens group G4 having a positive refractive power, and a fifth lens group G5 in this order from the object side along the optical axis Z. Note that the aperture stop St shown in FIG. 2 does not necessarily represent the size or shape thereof, but represents the position thereof on the optical axis Z. Further, "having a positive refractive power" will be simply described as "positive" and "having a negative refractive power" will be simply described as "negative" below.

The first lens group G1 is constituted by a negative 11 lens L11, a positive 12 lens L12 which is cemented to this 11 lens L11, a positive 13 lens L13, and a positive 14 lens L14 in this order from the object side along the optical axis Z. Note that a lens which is second from the object side in the first lens group G1 is referred to as "a 12 lens" as described above, for example (the same applies hereinafter).

As described above, the first lens group G1 is constituted by a cemented lens formed by cementing a negative lens and a positive lens together, a positive lens and a positive lens in this order from the object side. This configuration can suppress longitudinal chromatic aberration and spherical aberration particularly in the vicinity of the telephoto end.

The second lens group G2 is constituted by a negative 21 lens L21, a negative 22 lens L22, a positive 23 lens L23, and a negative 24 lens L24 in this order from the object side along the optical axis Z. Note that the air space is provided between the 21 lens L21 and the 22 lens L22. Further, the 23 lens L23 and the 24 lens L24 are cemented to each other.

If the 23 lens L23 and the 24 lens L24 are cemented to each other as described above, the joint surface formed thereby enables correction of field curvature and chromatic aberration.

The third lens group G3 is constituted by a positive 31 lens L31, a negative 32 lens L32, a positive 33 lens L33, a negative 34 lens L34, a positive 35 lens L35, and a negative 36 lens L36 in this order from the object side along the optical axis Z.

The 31 lens L31, the 32 lens L32, and the 33 lens L33 constitute a third-a lens group G3a which is fixed when correcting camera shake. Further, the 34 lens L34 and the 35 lens L35 have a positive refractive power as a whole, and constitute a third-b lens group G3b which is capable of shifting an image on the image formation plane Sim by moving in a direction that intersects the optical axis Z when correcting camera shake. Further, the negative 36 lens L36 constitutes a third-c lens group G3c which is fixed when correcting camera shake.

The 32 lens L32 and the 33 lens L33 of the third-a lens group G3a are cemented to each other. The joint surface formed thereby enables longitudinal chromatic aberration to be corrected.

The 34 lens L34 and the 35 lens L35 of the third-b lens group G3b are cemented to each other to form a cemented lens. The third-b lens group G3b is constituted only by this cemented lens. The 35 lens L35 which is a positive lens is formed by the medium, the Abbe number of which is greater than that of the 34 lens L34 which is a negative lens. Therefore, the joint surface formed by both of the lenses L34 and L35 enables correcting chromatic aberration. Note that more particularly, as shown in Table 1 to be described later, the Abbe number of the 34 lens L34 is 23.34, whereas the Abbe number of the 35 lens L35 is 57.35.

The fourth lens group G4 is constituted by a positive 41 lens L41, a negative 42 lens L42, and a positive 43 lens L43 in this order from the object side along the optical axis Z. Note that the 41 lens L41 and the 42 lens L42 are cemented to each other.

The 41 lens L41 above which is a positive lens is formed by the medium, the Abbe number of which is greater than that of the 42 lens L42 which is cemented to the 41 lens L41 and is a negative lens. Accordingly, the joint surface formed by both of the lenses L41 and L42 enables correcting chromatic aberration. Note that more particularly, as shown in Table 1 to be described later, the Abbe number of the 42 lens L42 is 22.75, whereas the Abbe number of the 41 lens L41 is 63.16.

Further, as shown in Table 1 to be described later, both surfaces of the positive 43 lens L43, which is disposed on the most-image side in the fourth lens group G4, are aspherical surfaces. These aspherical surfaces enable spherical aberration to be corrected.

The fifth lens group G5 is constituted by a negative 51 lens L51, and a positive 52 lens L52 in this order from the object side along the optical axis Z. These lenses L51 and L52 constitute a single cemented lens having a meniscus shape with a convex surface toward the image side. Thereby, the outer diameters of the lenses in the fourth lens group G4 which is a focusing group can be suppressed to reduce the weight thereof. This makes it easy to design a driving system for focusing.

The 51 lens L51, which is the concave-surface-side lens of the joint surface of the cemented lens above, is formed by the medium, the refractive index of which is greater than that of the 52 lens L52 which is the convex-surface-side lens. Thereby, the joint surface of the cemented lens operates to diffuse the axial luminous flux. This will be advantageous from the viewpoint of correcting spherical aberration. Note that more particularly, as shown in Table 1 to be described later, the refractive index of the 52 lens L52 is 1.64684, and the refractive index of the 51 lens L51 is 1.84293.

Table 1 shows basic lens data of the zoom lens of Example 1. The column Si shows the i-th (i=1, 2, 3, . . . ) surface number, the value of i sequentially increasing from the object-side surface of the constituent element at the most object side, which is designated as 1, toward the image side. The column Ri shows the radii of curvature of the i-th surface, and the column Di shows the distances between i-th surfaces and i+1st surfaces along the optical axis Z. Further, the column Ndj shows the refractive indices of j-th (j=1, 2, 3, . . . ) optical elements with respect to the d-line (wavelength: 587.56 nm), the value of j sequentially increasing from the constituent element at the most object side, which is designated as 1, toward the image side. The column vdj shows the Abbe numbers of j-th optical elements with respect to the d-line.

The basic lens data also shows the aperture stop St and the optical member GP. Further, the column of the surface number of a surface corresponding to the aperture stop St indicates a surface number and the text (stop). Note that the optical member GP is presumed to be formed by bringing two members into a close contact with each other in this Example. The sign of the radius of curvature is positive in the case that a surface shape is convex on the object side, and negative in the case that the surface shape is convex on the image side. The value in the lowest column of the distance between surfaces Di represents the distance between the image-side surface of the optical member GP and the imaging plane Sim. The mark "*" is indicated at surface numbers of aspherical surfaces. The column of the radii of curvature Ri of the aspherical surface indicates numerical values of paraxial radii of curvature.

A portion of the distances between surfaces is a variable distance between surfaces, which varies when changing magnification. The basic lens data in Table 1 indicates DD[i] when the distance between i-th surface and i+1st surface is the variable distance. In this Example, the distance between the first lens group G1 and the second lens group G2, the distance between the second lens group G2 and the third lens group G3, the distance between the third lens group G3 and the fourth lens group G4, and the distance between the fourth lens group G4 and the fifth lens group G5 are variable distances which vary when changing magnification, and are respectively indicated as DD[7], DD[14], DD[25] and DD[30] in Table 1.

Table 2 shows the specs with respect to the d-line and data related to changes in magnification and focusing of the zoom lens in Example 1 at each of the wide angle end, the intermediate position, and the telephoto end. In this Table 2, f' is the focal length, Bf is the back focus (air equivalent length), FNo. denotes the F number, and 2ω denotes the full angle of view (degrees are used as the unit). Further, in this Table 2, values regarding the length, i.e., the focal length f' of the entire system, the back focus Bf, and the variable distance described below between surfaces are normalized such that the focal length f' of the entire system at the wide angle end is 1.00. The same applies to the radius of curvature Ri and the distance between surfaces Di in Table 1.

Further, Table 2 shows values corresponding to the variable distances between surfaces DD[7], DD[14], DD[25] and DD[30] above at each of the wide angle end, the intermediate position, and the telephoto end of the zoom lens in Example 1. Note that these values are for when the zoom lens is focused on the object at infinity.

Table 3 shows the aspherical surface coefficients of the aspherical surfaces in Example 1. Note that "E±n" (n: integer) in each of the numerical values of the aspheric surface coefficients means "×10$^{\pm n}$". The aspheric surface coefficients are the values of respective coefficients KA, Am (m=3, 4, 5, . . . 16) in the aspheric surface formula below:

$$Zd = C \cdot h^2 / \{1 + (1 - KA \cdot C^2 \cdot h^2)^{1/2}\} + \Sigma Am \cdot h^m$$

where,

Zd: the depth of an aspheric surface (the length of a perpendicular line drawn from a point on an aspheric surface with a height h to a plane perpendicular to the optical axis which contacts the peak of the aspheric surface)

h: height (the distance from the optical axis to a lens surface)

C: an inverse number of a paraxial radius of curvature

KA, Am: aspherical surface coefficients (m=3, 4, 5, . . . 16).

Note that the values regarding the length are normalized such that the focal length f' of the entire system at the wide angle end is 1.00 in the formula above that shows the depth Zd of an aspheric surface as well. Further, values rounded to a predetermined digit are shown in Tables 1 through 3.

TABLE 1

Example 1/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 1 | 62.5575 | 0.52 | 1.80518 | 25.42 |
| 2 | 14.3128 | 2.37 | 1.49700 | 81.54 |
| 3 | −59.4270 | 0.02 | | |
| 4 | 24.2322 | 1.08 | 1.49700 | 81.54 |
| 5 | 734.3554 | 0.02 | | |
| 6 | 9.9476 | 1.11 | 1.80400 | 46.58 |
| 7 | 25.6487 | DD[7] | | |
| 8 | 13.7361 | 0.19 | 1.88300 | 40.76 |
| 9 | 1.8680 | 1.04 | | |
| 10 | −6.7792 | 0.17 | 1.88300 | 40.76 |
| 11 | 7.0903 | 0.02 | | |
| 12 | 3.8928 | 1.02 | 1.84661 | 23.78 |
| 13 | −4.6854 | 0.18 | 1.83481 | 42.73 |
| 14 | 49.3245 | DD[14] | | |
| 15(Stop) | ∞ | 0.47 | | |
| *16 | 24.7930 | 0.84 | 1.58313 | 59.46 |
| *17 | −5.6525 | 0.20 | | |
| 18 | −3.8406 | 0.20 | 1.84501 | 43.50 |
| 19 | 3.4552 | 1.22 | 1.78210 | 25.89 |
| 20 | −8.2959 | 0.79 | | |
| 21 | 6.8295 | 0.21 | 1.84501 | 23.34 |
| 22 | 4.1092 | 1.22 | 1.48749 | 57.35 |
| 23 | −10.5181 | 0.35 | | |
| 24 | −8.3564 | 0.38 | 1.84501 | 43.50 |
| 25 | −48.8576 | DD[25] | | |
| 26 | 10.2132 | 1.20 | 1.54797 | 63.16 |
| 27 | −4.3028 | 0.22 | 1.84501 | 22.75 |
| 28 | −10.8826 | 0.12 | | |
| *29 | 9.2468 | 1.20 | 1.58313 | 59.46 |
| *30 | −5.8227 | DD[30] | | |
| 31 | −6.1420 | 0.23 | 1.84293 | 43.71 |
| 32 | 6.0096 | 1.29 | 1.64684 | 39.15 |
| 33 | −4.7820 | 2.39 | | |
| 34 | ∞ | 4.92 | 1.70155 | 41.10 |
| 35 | ∞ | 1.58 | 1.51632 | 64.00 |
| 36 | ∞ | 0.02 | | |

TABLE 2

Example 1/Specs (d-line)

| | Wide | Intermediate | Telephoto |
|---|---|---|---|
| Zoom Ratios | 1.0 | 5.9 | 19.5 |
| f | 1.00 | 5.95 | 19.52 |
| Bf | 6.33 | 6.33 | 6.33 |
| FNo. | 1.66 | 2.50 | 3.07 |
| 2ω[°] | 73.6 | 13.6 | 4.2 |
| DD[7] | 0.21 | 7.58 | 10.02 |
| DD[14] | 10.14 | 2.77 | 0.33 |
| DD[25] | 2.20 | 1.05 | 1.56 |
| DD[30] | 0.35 | 1.50 | 0.99 |

TABLE 3

Example 1/Aspherical Surface Coefficients

| Surface Number | 16 | 17 |
|---|---|---|
| KA | −1.4830907E+01 | −6.7784973E+00 |
| A3 | 3.2274563E−07 | 1.6594979E−06 |
| A4 | 3.5241094E−03 | −5.3916580E−03 |
| A5 | −4.3684296E−04 | 1.5825505E−03 |
| A6 | −1.1177234E−04 | −2.6095717E−03 |
| A7 | 2.1091717E−04 | 1.9344589E−03 |
| A8 | −2.3834841E−04 | −1.2950272E−03 |
| A9 | 1.5429027E−04 | 1.2750720E−03 |
| A10 | −3.6189639E−05 | −6.8241720E−04 |
| A11 | 2.9826322E−06 | −1.3949296E−04 |
| A12 | −3.6243351E−05 | 3.5078613E−04 |
| A13 | 4.9841153E−05 | −1.8288619E−04 |
| A14 | −2.8970549E−05 | 4.6889139E−05 |
| A15 | 8.2118484E−06 | −5.7025755E−06 |
| A16 | −9.3787084E−07 | 1.8275573E−07 |

| Surface Number | 29 | 30 |
|---|---|---|
| KA | −3.9652670E+00 | −1.5122130E+00 |
| A3 | −7.7009294E−07 | −5.3665512E−07 |
| A4 | −3.5335231E−04 | 6.2838405E−04 |
| A5 | 1.5281233E−03 | −1.6663875E−04 |
| A6 | −1.1570932E−03 | 6.1665658E−05 |
| A7 | 2.9876758E−05 | −8.9456155E−05 |
| A8 | 3.3673581E−04 | 9.0253621E−05 |
| A9 | −9.4220684E−05 | −5.5210801E−05 |
| A10 | −4.9077647E−05 | 1.6765088E−05 |
| A11 | 2.1340030E−05 | 2.5648160E−06 |
| A12 | 1.0727559E−05 | −5.0947242E−06 |
| A13 | −1.0933248E−05 | 2.4337996E−06 |
| A14 | 3.9933072E−06 | −6.2553309E−07 |
| A15 | −7.4014088E−07 | 8.7973798E−08 |
| A16 | 5.7397779E−08 | −5.3506279E−09 |

Figure 8:
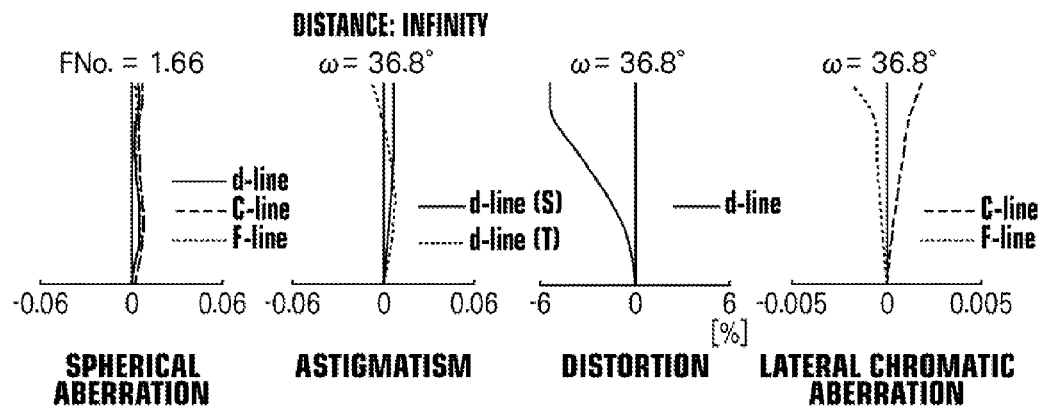
FIG. 8 illustrates aberration diagrams of the imaging lens of Example 1 described above.
Figure 8:
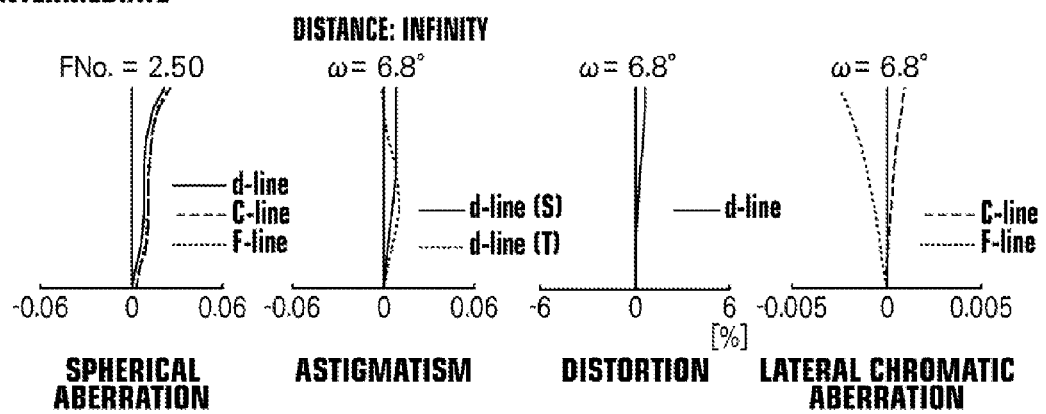
Figure 8:
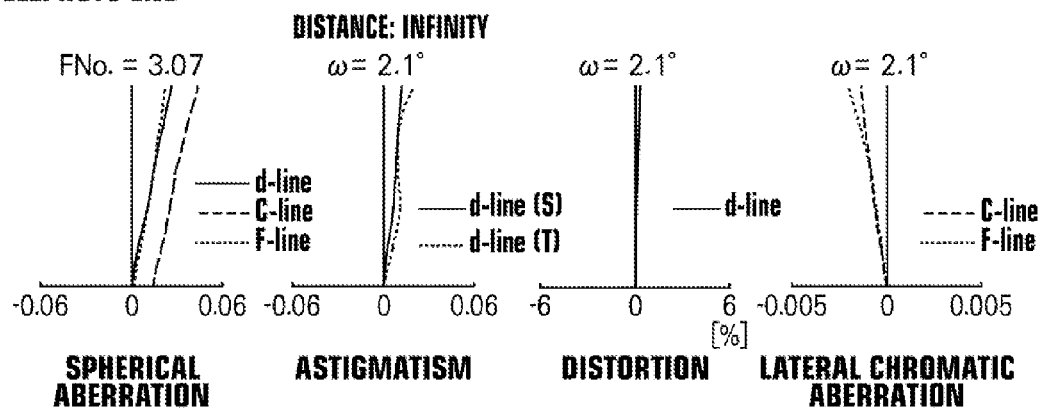

The upper stage of FIG. 8 shows the respective aberration diagrams of spherical aberration, astigmatism, distortion and lateral chromatic aberration of the zoom lens in Example 1 at the wide angle end in this order from the left to the right side. Further, the middle stage of FIG. 8 shows the respective aberration diagrams of spherical aberration, astigmatism, distortion and lateral chromatic aberration of the zoom lens in Example 1 at the middle position in this order from the left to the right side. Moreover, the lower stage of FIG. 8 shows the respective aberration diagrams of spherical aberration, astigmatism, distortion, and lateral chromatic aberration of the zoom lens in Example 1 at the telephoto end in this order from the left to the right side. All of the aberration diagrams above are for when the zoom lens is focused on the object at infinity.

Each of the aberration diagrams shows aberration with respect to the d-line (wavelength: 587.56 nm) which is the reference wavelength. The spherical aberration diagram also shows aberration with respect to the C-line (wavelength: 656.27 nm) and aberration with respect to the F-line (wavelength: 486.13 nm). The lateral chromatic aberration diagram shows aberration with respect to the C-line and aberration with respect to the F-line The astigmatism diagram shows aberration in a sagittal direction with a solid line and aberration in a tangential direction with a broken line. The symbols (S) and (T) are respectively denoted associated with descriptions of the types of lines. FNo. of the spherical aberration diagram denotes the F number, and ω of the other aberration diagrams denotes the half angle of view.

As described above, the symbols that represent each item of data, the meanings thereof, and the manners in which they are shown described in Example 1 apply to the Examples below, unless otherwise noted. Accordingly, redundant descriptions thereof will be omitted.

EXAMPLE 2

Figure 3:
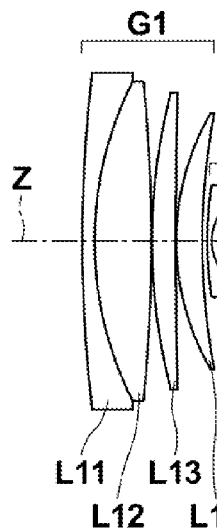
FIG. 3 is a cross-sectional view illustrating the lens configuration of an imaging lens of Example 2 of the present invention.
Figure 3:
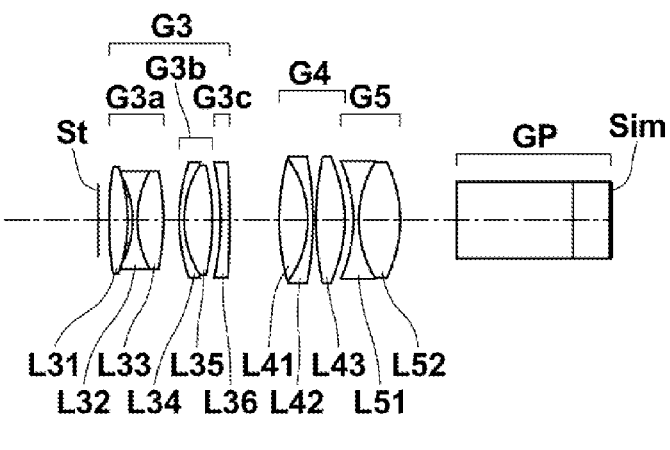
Figure 3:
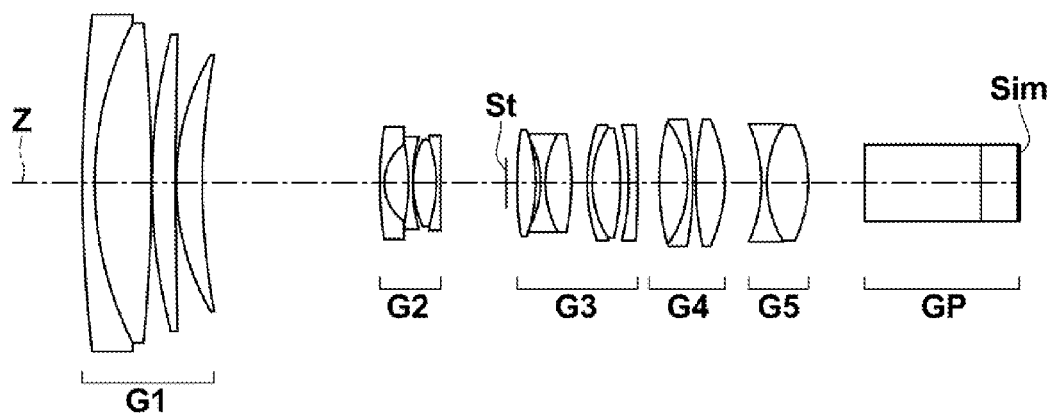
Figure 3:
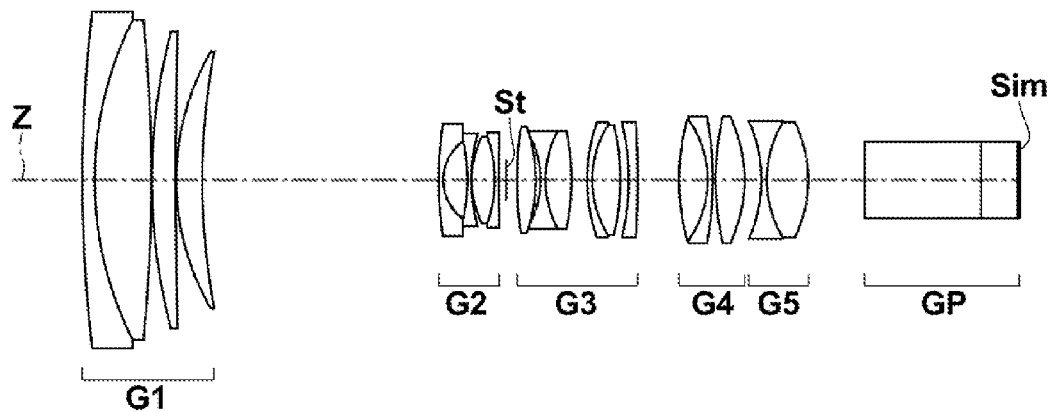

The lens configuration of the zoom lens of Example 2 is shown in FIG. 3. The schematic configuration of the zoom lens of Example 2 is substantially the same as that of the zoom lens of Example 1 described above.

Figure 9:
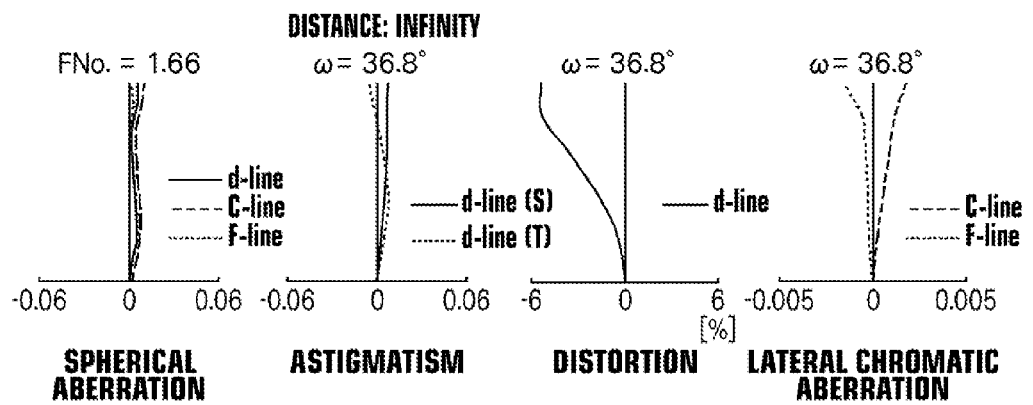
FIG. 9 illustrates aberration diagrams of the imaging lens of Example 2 described above.
Figure 9:
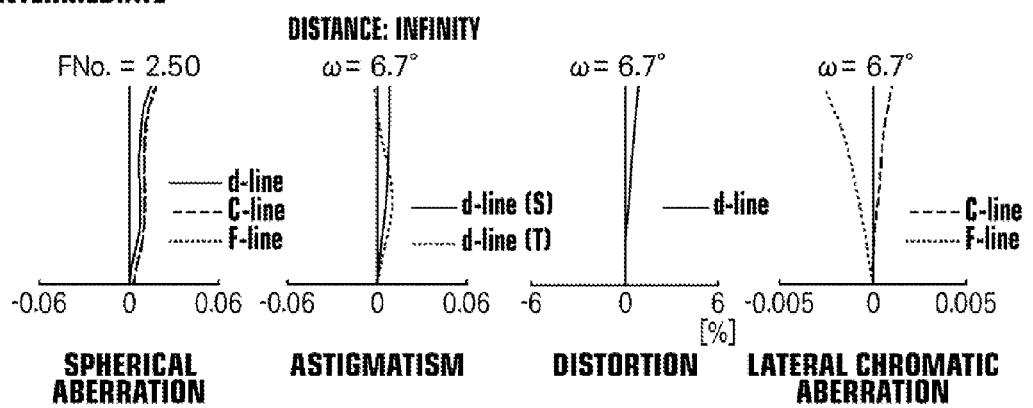
Figure 9:
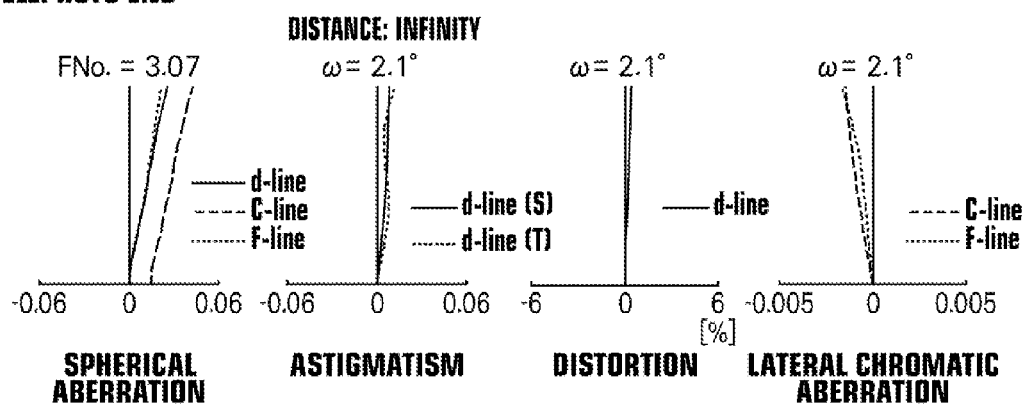

Tables 4, 5 and 6 respectively show basic lens data, data related to specs and changes in magnification/focusing, and aspherical surface coefficients of the zoom lens of Example 2. FIG. 9 shows the respective aberration diagrams of the zoom lens of Example 2.

TABLE 4

Example 2/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 1 | 56.8439 | 0.52 | 1.80518 | 25.42 |
| 2 | 13.9638 | 2.40 | 1.49700 | 81.54 |
| 3 | −61.9007 | 0.02 | | |
| 4 | 23.1316 | 1.01 | 1.49700 | 81.54 |
| 5 | 238.1287 | 0.02 | | |
| 6 | 10.1021 | 1.10 | 1.80400 | 46.58 |
| 7 | 27.3592 | DD[7] | | |
| 8 | 14.2796 | 0.19 | 1.88300 | 40.76 |
| 9 | 1.8911 | 1.02 | | |
| 10 | −7.1447 | 0.17 | 1.88300 | 40.76 |
| 11 | 6.8241 | 0.02 | | |
| 12 | 3.8768 | 0.98 | 1.84661 | 23.78 |
| 13 | −5.2151 | 0.18 | 1.83481 | 42.73 |
| 14 | 126.2615 | DD[14] | | |
| 15(Stop) | ∞ | 0.47 | | |
| *16 | 38.2624 | 0.77 | 1.58313 | 59.46 |
| *17 | −6.1929 | 0.21 | | |
| 18 | −3.6458 | 0.20 | 1.84501 | 43.50 |
| 19 | 4.0435 | 1.10 | 1.81507 | 24.25 |
| 20 | −9.6464 | 0.67 | | |
| 21 | 6.9272 | 0.21 | 1.83953 | 28.21 |
| 22 | 4.0731 | 1.19 | 1.48749 | 57.35 |
| 23 | −9.2373 | 0.35 | | |
| 24 | −9.8597 | 0.38 | 1.82803 | 45.20 |
| 25 | −35.8381 | DD[25] | | |
| 26 | 9.2622 | 1.20 | 1.51995 | 63.32 |
| 27 | −4.1315 | 0.22 | 1.84500 | 22.75 |
| 28 | −13.7909 | 0.12 | | |
| *29 | 10.6566 | 1.23 | 1.58313 | 59.46 |
| *30 | −5.1097 | DD[30] | | |
| 31 | −5.6420 | 0.23 | 1.77929 | 50.07 |
| 32 | 4.3801 | 1.75 | 1.70843 | 45.51 |
| 33 | −5.1076 | 2.39 | | |
| 34 | ∞ | 4.92 | 1.70155 | 41.10 |
| 35 | ∞ | 1.58 | 1.51632 | 64.00 |
| 36 | ∞ | 0.01 | | |

TABLE 5

Exanple 2/Specs (d-line)

| | Wide | Intermediate | Telephoto |
|---|---|---|---|
| Zoom Ratios | 1.0 | 5.9 | 19.5 |
| f | 1.00 | 5.95 | 19.52 |
| Bf | 6.34 | 6.34 | 6.34 |
| FNo. | 1.66 | 2.50 | 3.07 |
| 2ω[°] | 73.6 | 13.4 | 4.2 |
| DD[7] | 0.21 | 7.50 | 9.99 |
| DD[14] | 10.09 | 2.80 | 0.31 |
| DD[25] | 2.10 | 0.92 | 1.76 |
| DD[30] | 0.36 | 1.54 | 0.70 |

TABLE 6

Example 2/Aspherical Surface Coefficients

| Surface Number | 16 | 17 |
|---|---|---|
| KA | −1.4676615E+01 | −6.8500601E+00 |
| A3 | −5.2503283E−07 | −2.6469422E−06 |
| A4 | 6.1542330E−03 | −1.7630703E−03 |
| A5 | −8.0261417E−04 | 1.6068166E−03 |
| A6 | 2.2116537E−04 | −2.7321930E−03 |
| A7 | −4.8862624E−04 | −6.2340824E−04 |
| A8 | 5.2682716E−04 | 3.7675774E−03 |
| A9 | −7.5122916E−05 | −3.0053018E−03 |
| A10 | −5.1876742E−04 | 8.1473667E−04 |
| A11 | 6.5066864E−04 | −6.9008165E−05 |
| A12 | −3.1267727E−04 | 3.7617472E−04 |
| A13 | −4.6003609E−06 | −5.5552025E−04 |
| A14 | 7.2993883E−05 | 3.5033607E−04 |
| A15 | −3.0667549E−05 | −1.0791384E−04 |
| A16 | 4.2741351E−06 | 1.3316900E−05 |

| Surface Number | 29 | 30 |
|---|---|---|
| KA | −4.1096673E+00 | −1.2464168E+00 |
| A3 | −1.3586751E−06 | −4.2777417E−08 |
| A4 | −6.2285514E−04 | 4.2553668E−04 |
| A5 | 1.6886190E−03 | −1.1361229E−04 |
| A6 | −1.2765292E−03 | 7.0181691E−06 |
| A7 | −4.4168116E−05 | −6.6585644E−06 |
| A8 | 5.0714647E−04 | 7.5228212E−06 |
| A9 | −1.9029311E−04 | −3.4834405E−06 |
| A10 | −3.4802139E−05 | 3.9843175E−07 |
| A11 | 2.9391313E−05 | 2.3075048E−07 |
| A12 | 5.4835971E−06 | 1.1673480E−07 |
| A13 | −9.3851760E−06 | −2.2052445E−07 |
| A14 | 3.7730191E−06 | 1.0432887E−07 |
| A15 | −7.4364433E−07 | −2.2316108E−08 |
| A16 | 6.0829704E−08 | 1.8752975E−09 |

EXAMPLE 3

Figure 4:
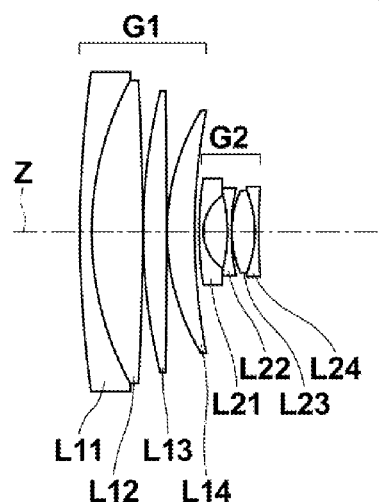
FIG. 4 is a cross-sectional view illustrating the lens configuration of an imaging lens of Example 3 of the present invention.
Figure 4:
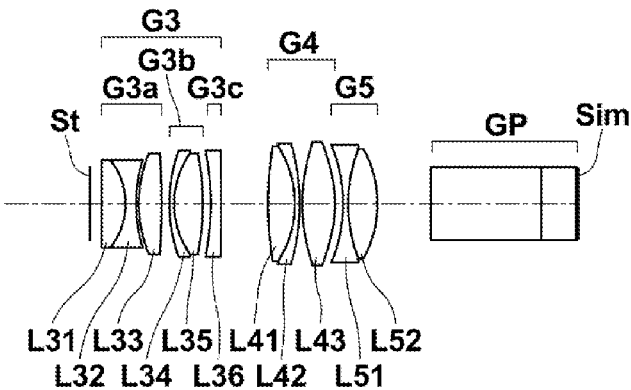
Figure 4:
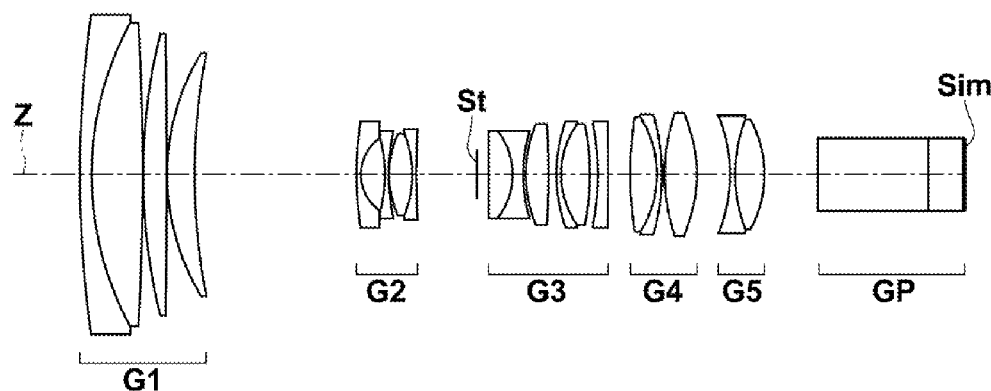
Figure 4:
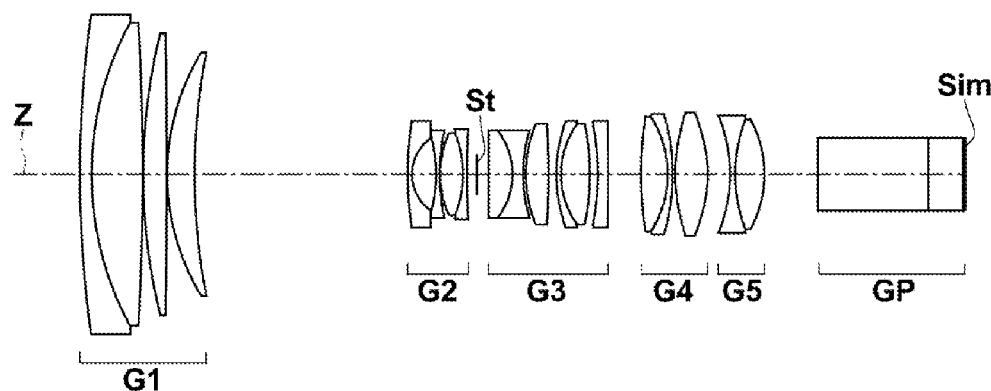

FIG. 4 shows the lens configuration of the zoom lens of Example 3. The schematic configuration of the zoom lens of Example 3 is substantially the same as that of the zoom lens of Example 1 described above, but differs in the configuration of the third-a lens group G3*a*. That is, in the zoom lens of Example 1, the 32 lens L32 and the 33 lens L33 in the third-a lens group G3*a* are cemented to each other and both surfaces of the 31 lens L31 are aspherical surfaces, whereas in the zoom lens of Example 3, the 31 lens L31 and the 32 lens L32 are cemented to each other and both surfaces of the 33 lens L33 are aspherical surfaces.

In the zoom lens of Example 3 as well, the 31 lens L31 and the 32 lens L32 are cemented to each other. Accordingly, the joint surface formed thereby enables longitudinal chromatic aberration to be corrected.

Figure 10:
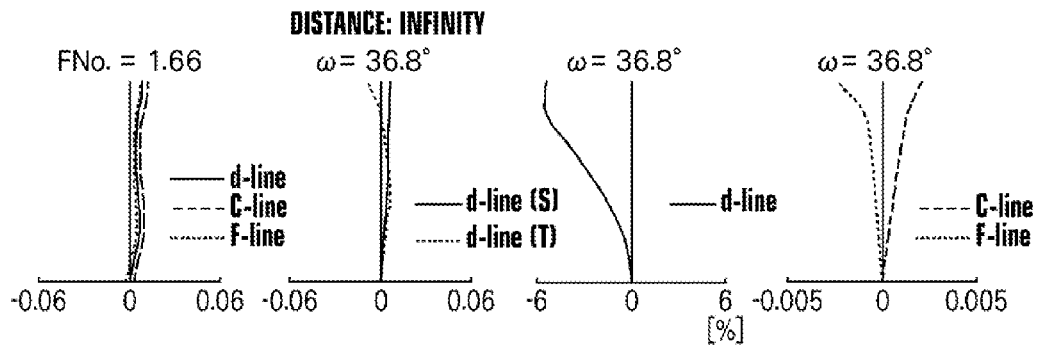
FIG. 10 illustrates aberration diagrams of the imaging lens of Example 3 described above.
Figure 10:
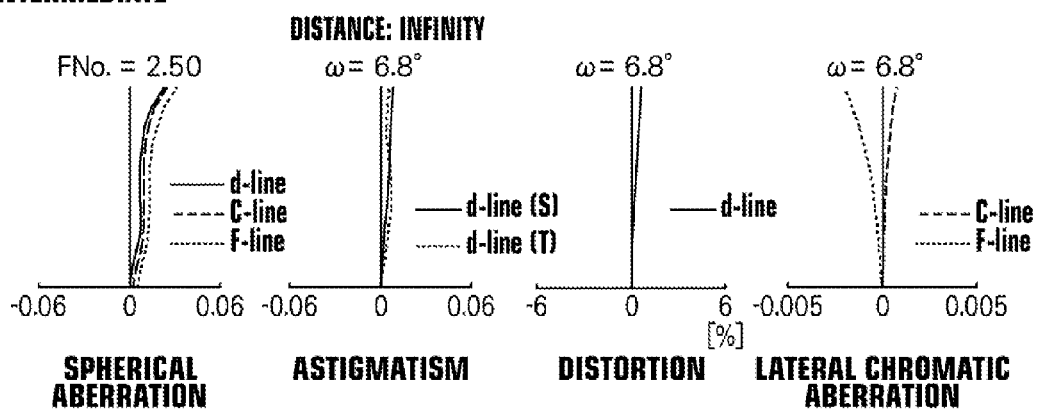
Figure 10:
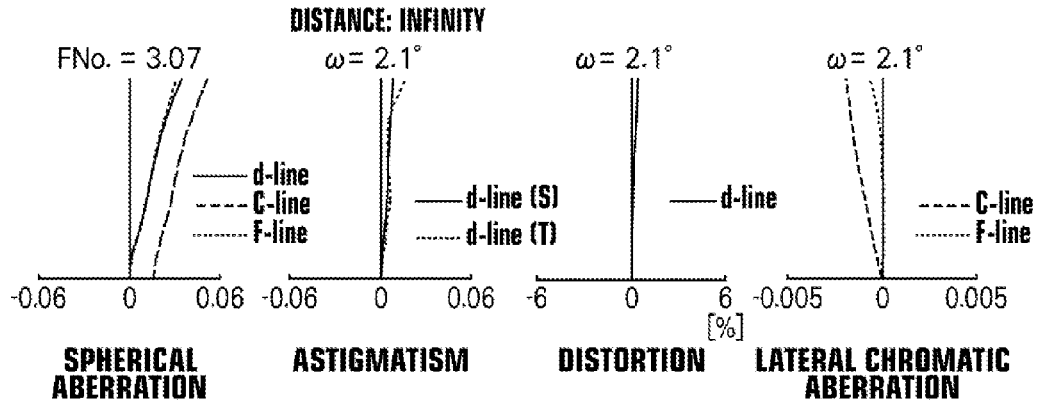

Tables 7, 8 and 9 respectively show basic lens data, data related to specs and changes in magnification/focusing, and aspherical surface coefficients of the zoom lens of Example 3. FIG. 10 shows the respective aberration diagrams of the zoom lens of Example 3.

TABLE 7

Example 3/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 1 | 47.4096 | 0.52 | 1.80518 | 25.42 |
| 2 | 13.2276 | 2.27 | 1.49700 | 81.54 |
| 3 | −109.3394 | 0.02 | | |

TABLE 7-continued

Example 3/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 4 | 24.1568 | 1.05 | 1.49700 | 81.54 |
| 5 | −322.5301 | 0.02 | | |
| 6 | 9.7071 | 1.22 | 1.80400 | 46.58 |
| 7 | 25.7766 | DD[7] | | |
| 8 | 14.4280 | 0.19 | 1.88300 | 40.76 |
| 9 | 1.8530 | 1.07 | | |
| 10 | −6.0249 | 0.17 | 1.88300 | 40.76 |
| 11 | 8.4718 | 0.02 | | |
| 12 | 4.1383 | 1.03 | 1.84661 | 23.78 |
| 13 | −4.4428 | 0.18 | 1.83481 | 42.73 |
| 14 | 36.8220 | DD[14] | | |
| 15(Stop) | ∞ | 0.52 | | |
| 16 | −11560.0412 | 1.06 | 1.80809 | 22.76 |
| 17 | −2.9546 | 0.47 | 1.83481 | 42.73 |
| 18 | 6.1754 | 0.12 | | |
| *19 | 5.4851 | 1.01 | 1.58313 | 59.46 |
| *20 | −30.8703 | 0.35 | | |
| 21 | 6.4985 | 0.21 | 1.85026 | 32.27 |
| 22 | 3.6350 | 1.28 | 1.51823 | 58.90 |
| 23 | −10.4310 | 0.35 | | |
| 24 | −11.0019 | 0.47 | 1.90366 | 31.32 |
| 25 | −119.6109 | DD[25] | | |
| 26 | 14.7558 | 1.19 | 1.48749 | 70.23 |
| 27 | −4.4427 | 0.22 | 1.92286 | 20.88 |
| 28 | −8.7698 | 0.12 | | |
| *29 | 7.4432 | 1.45 | 1.58313 | 59.46 |
| *30 | −5.4735 | DD[30] | | |
| 31 | −6.3357 | 0.23 | 1.83481 | 42.73 |
| 32 | 6.3453 | 1.30 | 1.61293 | 37.00 |
| 33 | −4.7796 | 2.39 | | |
| 34 | ∞ | 4.92 | 1.70155 | 41.10 |
| 35 | ∞ | 1.58 | 1.51632 | 64.00 |
| 36 | ∞ | 0.02 | | |

TABLE 8

Example 3/Specs (d-line)

| | Wide | Intermediate | Telephoto |
|---|---|---|---|
| Zoom Ratios | 1.0 | 5.9 | 19.5 |
| f | 1.00 | 5.95 | 19.52 |
| Bf | 6.34 | 6.34 | 6.34 |
| FNo. | 1.66 | 2.50 | 3.07 |
| 2ω[°] | 73.6 | 13.6 | 4.2 |
| DD[7] | 0.21 | 7.22 | 9.49 |
| DD[14] | 9.73 | 2.72 | 0.45 |
| DD[25] | 2.09 | 0.98 | 1.46 |
| DD[30] | 0.36 | 1.47 | 0.99 |

TABLE 9

Example 3/Aspherical Surface Coefficients

| Surface Number | 19 | 20 |
|---|---|---|
| KA | −9.4414576E+00 | −1.4674591E−01 |
| A3 | 6.3011190E−06 | −6.0685373E−05 |
| A4 | 7.7461405E−03 | 6.1426080E−04 |
| A5 | 5.6935686E−04 | −2.4989111E−03 |
| A6 | −2.0333023E−03 | 5.3091258E−03 |
| A7 | 2.0139162E−03 | −6.2156287E−03 |
| A8 | −2.2242185E−03 | 3.5407743E−03 |
| A9 | 9.7664316E−04 | −1.0919031E−03 |
| A10 | 7.6768163E−04 | −8.2552640E−04 |
| A11 | −1.2462783E−03 | 1.3173181E−06 |
| A12 | 6.8476656E−04 | 4.5402504E−04 |
| A13 | −1.5066669E−04 | −2.5825752E−04 |
| A14 | −1.4194123E−05 | 4.7088359E−05 |

TABLE 9-continued

Example 3/Aspherical Surface Coefficients

| A15 | 1.3394577E−05 | 2.8765524E−06 |
| A16 | −1.8934929E−06 | −1.3924124E−06 |

| Surface Number | 29 | 30 |
|---|---|---|
| KA | −2.4179270E+00 | −1.4812376E+00 |
| A3 | 8.5847683E−07 | 1.8117393E−07 |
| A4 | −2.2680531E−04 | 2.5707788E−04 |
| A5 | 1.2348659E−03 | 4.1976530E−05 |
| A6 | −9.3205475E−04 | −1.8822174E−05 |
| A7 | 2.0945628E−04 | 2.8981098E−05 |
| A8 | 3.5398093E−05 | −2.5230538E−05 |
| A9 | 4.9122819E−05 | 1.3242232E−05 |
| A10 | −5.3513153E−05 | −2.7448912E−06 |
| A11 | −8.6108485E−08 | −1.0852260E−06 |
| A12 | 1.5944685E−05 | 9.1852957E−07 |
| A13 | −7.9911995E−06 | −2.4549231E−07 |
| A14 | 1.9136393E−06 | 1.7262141E−08 |
| A15 | −2.4656927E−07 | 4.0849411E−09 |
| A16 | 1.4111781E−08 | −6.4810109E−10 |

EXAMPLE 4

Figure 5:
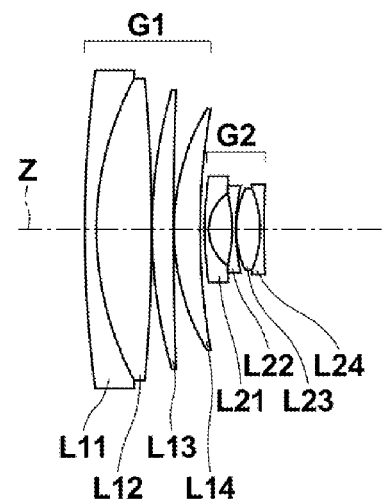
FIG. 5 is a cross-sectional view illustrating the lens configuration of an imaging lens of Example 4 of the present invention.
Figure 5:
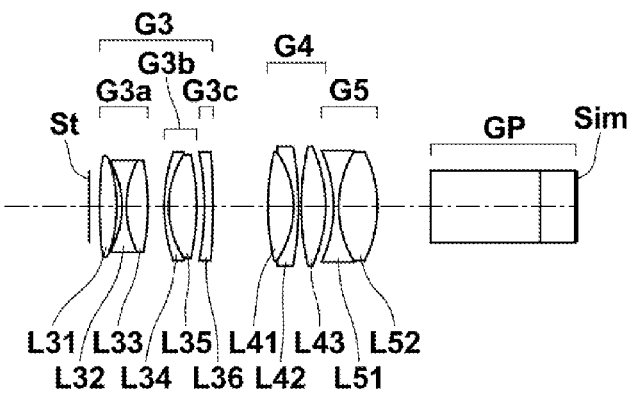
Figure 5:
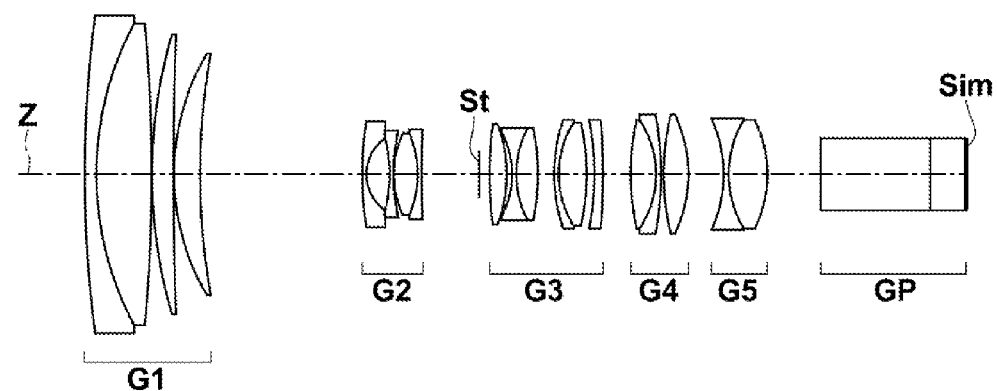
Figure 5:
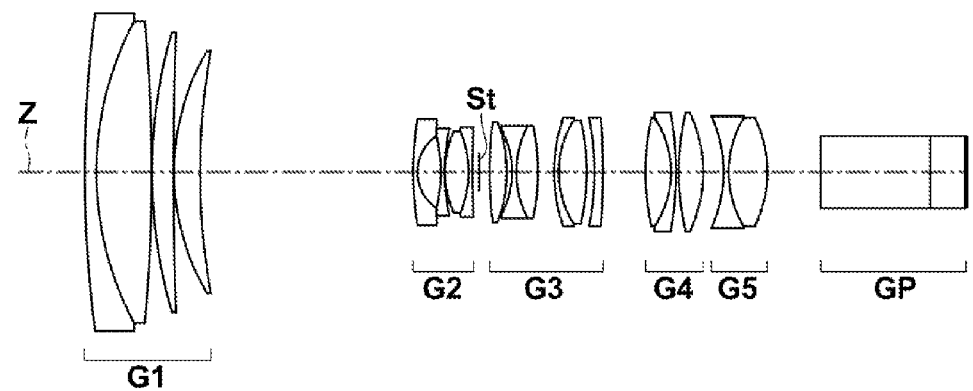
Figure 11:
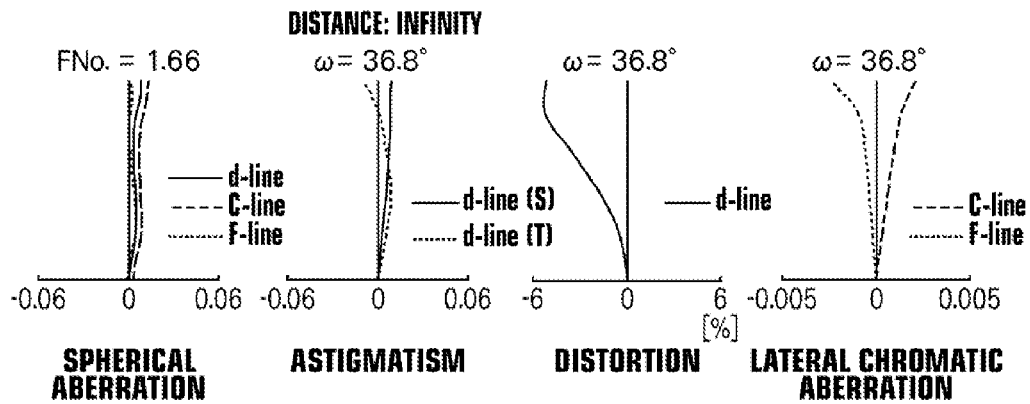
FIG. 11 illustrates aberration diagrams of the imaging lens of Example 4 described above.
Figure 11:
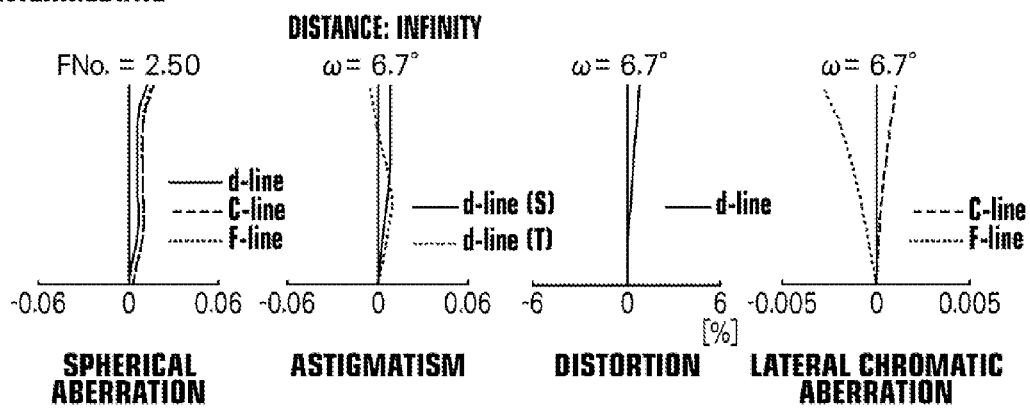
Figure 11:
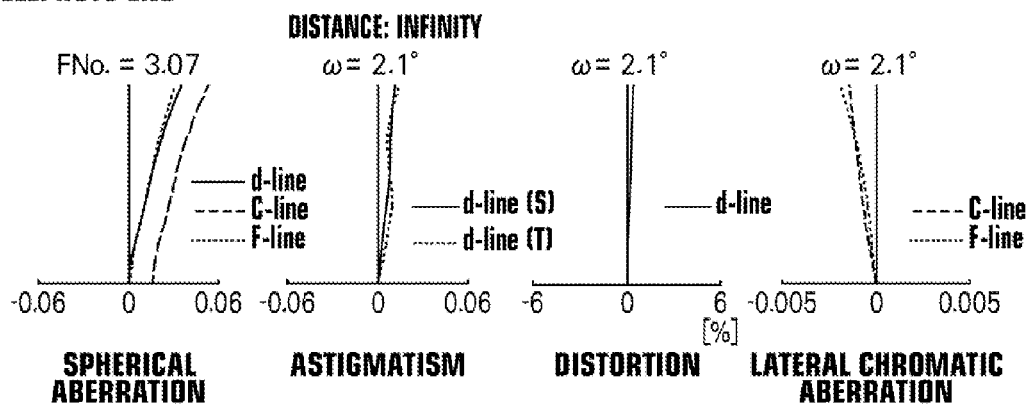

FIG. 5 shows the lens configuration of the zoom lens of Example 4. The schematic configuration of the zoom lens of Example 4 is substantially the same as that of the zoom lens of Example 1 described above Tables 10, 11, and 12 respectively show basic lens data, data related to specs and changes in magnification/focusing and aspherical surface coefficients of the zoom lens of Example 4. FIG. 11 shows the respective aberration diagrams of the zoom lens of Example 4,

TABLE 10

Example 4/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 1 | 51.1057 | 0.52 | 1.80518 | 25.42 |
| 2 | 13.3420 | 2.48 | 1.49700 | 81.54 |
| 3 | −69.2272 | 0.02 | | |
| 4 | 21.1449 | 0.96 | 1.49700 | 81.54 |
| 5 | 176.8167 | 0.02 | | |
| 6 | 9.9756 | 1.16 | 1.80400 | 46.58 |
| 7 | 27.7387 | DD[7] | | |
| 8 | 14.0658 | 0.19 | 1.88300 | 40.76 |
| 9 | 1.8589 | 1.04 | | |
| 10 | −6.2508 | 0.17 | 1.88300 | 40.76 |
| 11 | 8.0439 | 0.02 | | |
| 12 | 4.0726 | 1.07 | 1.84661 | 23.78 |
| 13 | −4.3605 | 0.18 | 1.83481 | 42.73 |
| 14 | 46.8130 | DD[14] | | |
| 15(Stop) | ∞ | 0.47 | | |
| *16 | 27.2981 | 0.76 | 1.58313 | 59.46 |
| *17 | −6.2869 | 0.24 | | |
| 18 | −3.7675 | 0.20 | 1.83914 | 43.98 |
| 19 | 4.1896 | 0.96 | 1.78572 | 26.26 |
| 20 | −9.7904 | 0.73 | | |
| 21 | 6.8331 | 0.21 | 1.84248 | 36.63 |
| 22 | 4.0500 | 1.25 | 1.48814 | 57.22 |
| 23 | −9.7759 | 0.35 | | |
| 24 | −11.6303 | 0.38 | 1.83846 | 44.14 |
| 25 | −27.0751 | DD[25] | | |
| 26 | 10.5210 | 1.14 | 1.49903 | 63.24 |
| 27 | −4.0856 | 0.22 | 1.84493 | 22.76 |
| 28 | −13.6321 | 0.12 | | |
| *29 | 10.1527 | 1.11 | 1.58313 | 59.46 |
| *30 | −5.1888 | DD[30] | | |
| 31 | −5.6285 | 0.23 | 1.77906 | 50.06 |
| 32 | 4.4628 | 1.73 | 1.70842 | 45.48 |

TABLE 10-continued

Example 4/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 33 | −5.1446 | 2.39 | | |
| 34 | ∞ | 4.92 | 1.70155 | 41.10 |
| 35 | ∞ | 1.58 | 1.51632 | 64.00 |
| 36 | ∞ | 0.02 | | |

TABLE 11

Example 4/Specs (d-line)

| | Wide | Intermediate | Telephoto |
|---|---|---|---|
| Zoom Ratios | 1.0 | 5.9 | 19.5 |
| f' | 1.00 | 5.95 | 19.52 |
| Bf' | 6.34 | 6.34 | 6.34 |
| FNo. | 1.66 | 2.50 | 3.07 |
| 2ω[°] | 73.6 | 13.4 | 4.2 |
| DD[7] | 0.21 | 7.27 | 9.56 |
| DD[14] | 9.65 | 2.59 | 0.30 |
| DD[25] | 2.47 | 1.24 | 1.91 |
| DD[30] | 0.35 | 1.58 | 0.91 |

TABLE 12

Example 4/Aspherical Surface Coefficients

| Surface Number | 16 | 17 |
|---|---|---|
| KA | −1.4611728E+01 | −6.8181158E+00 |
| A3 | −3.2445984E−06 | 1.5163942E−06 |
| A4 | 4.7714244E−03 | −3.0949107E−03 |
| A5 | −1.0963357E−03 | 1.7079119E−03 |
| A6 | 1.3670893E−03 | −2.9515927E−03 |
| A7 | −3.0336404E−03 | 3.9508117E−04 |
| A8 | 4.0565060E−03 | 2.4370121E−03 |
| A9 | −3.0641319E−03 | −3.0211878E−03 |
| A10 | 8.7383730E−04 | 2.6077863E−03 |
| A11 | 3.7352663E−04 | −2.3769470E−03 |
| A12 | −1.8841039E−04 | 1.9871172E−03 |
| A13 | −2.4095616E−04 | −1.2593799E−03 |
| A14 | 2.4556456E−04 | 5.3746149E−04 |
| A15 | −8.6189949E−05 | −1.3420468E−04 |
| A16 | 1.1130998E−05 | 1.4617857E−05 |

| Surface Number | 29 | 30 |
|---|---|---|
| KA | −4.1502973E+00 | −1.2070132E+00 |
| A3 | −3.3991320E−06 | −4.4430615E−08 |
| A4 | −5.2633508E−04 | 2.5917074E−04 |
| A5 | 1.5559759E−03 | −1.1242357E−04 |
| A6 | −1.0468673E−03 | 6.6731822E−06 |
| A7 | −3.2322490E−04 | −7.3032429E−06 |
| A8 | 8.2698796E−04 | 7.7995654E−06 |
| A9 | −4.8906900E−04 | −3.6643618E−06 |
| A10 | 1.3436386E−04 | 9.8984590E−09 |
| A11 | 6.5269175E−06 | 1.0668768E−06 |
| A12 | −3.6196693E−05 | −6.2682030E−07 |
| A13 | 2.5020038E−05 | 1.5627035E−07 |
| A14 | −8.9423153E−06 | −8.9787970E−09 |
| A15 | 1.6666160E−06 | −3.4046142E−09 |
| A16 | −1.2882715E−07 | 5.2046659E−10 |

EXAMPLE 5

Figure 6:
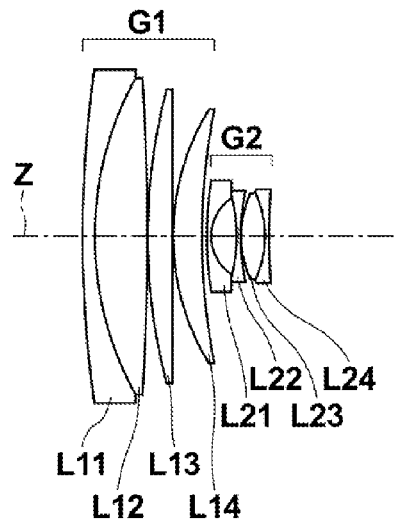
FIG. 6 is a cross-sectional view illustrating the lens configuration of an imaging lens of Example 5 of the present invention.
Figure 6:
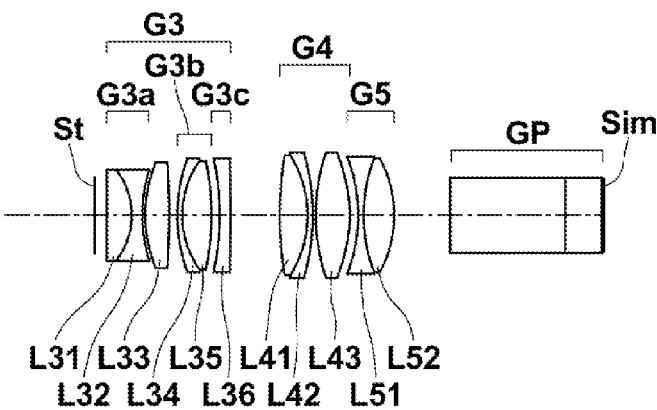
Figure 6:
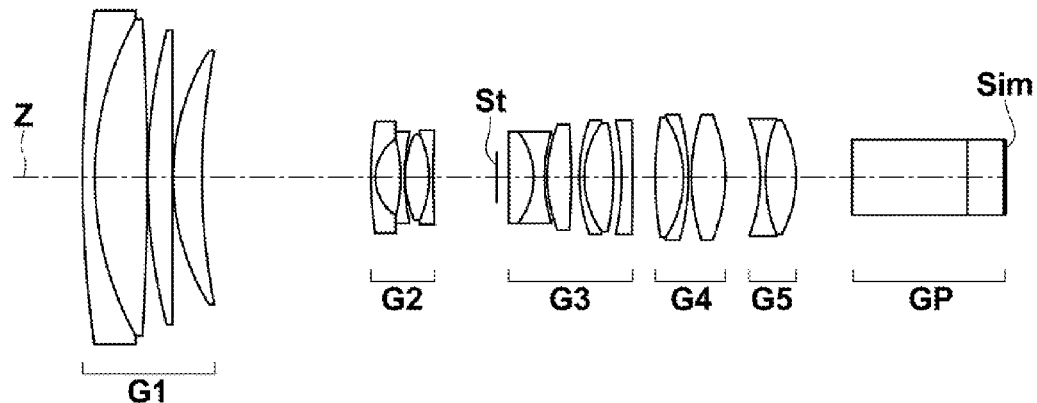
Figure 6:
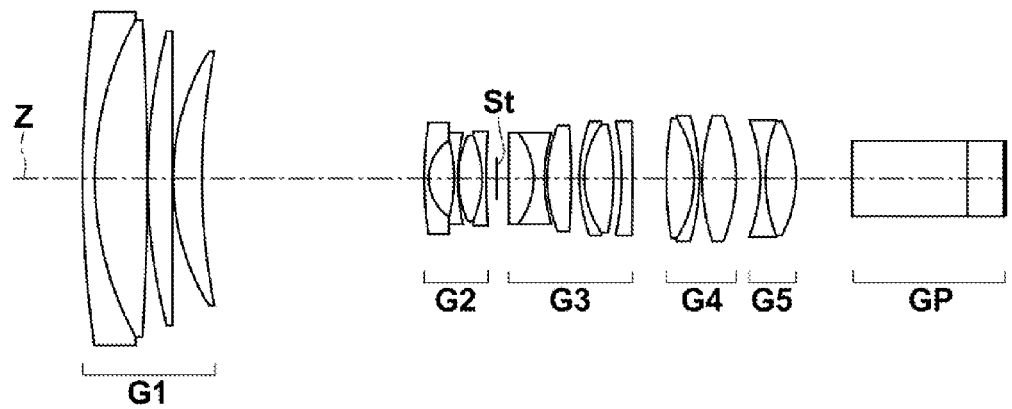

FIG. 6 shows the lens configuration of the zoom lens of Example 5. The schematic configuration of the zoom lens of Example 5 is substantially the same as that of the zoom lens of Example 1 described above, but differs in the configuration of the third-a lens group G3a. That is, in the zoom lens of Example 1, the 32 lens L32 and the 33 lens L33 in the third-a lens group G3a are cemented to each other and both surfaces of the 31 lens L31 are aspherical surfaces, whereas in the zoom lens of Example 3, the 31 lens L31 and the 32 lens L32 are cemented to each other and both surfaces of the 33 lens L33 are aspherical surfaces.

In the zoom lens of Example 5 as well, the 31 lens L31 and the 32 lens L32 are cemented to each other. Accordingly, the joint surface formed thereby enables longitudinal chromatic aberration to be corrected.

Figure 12:
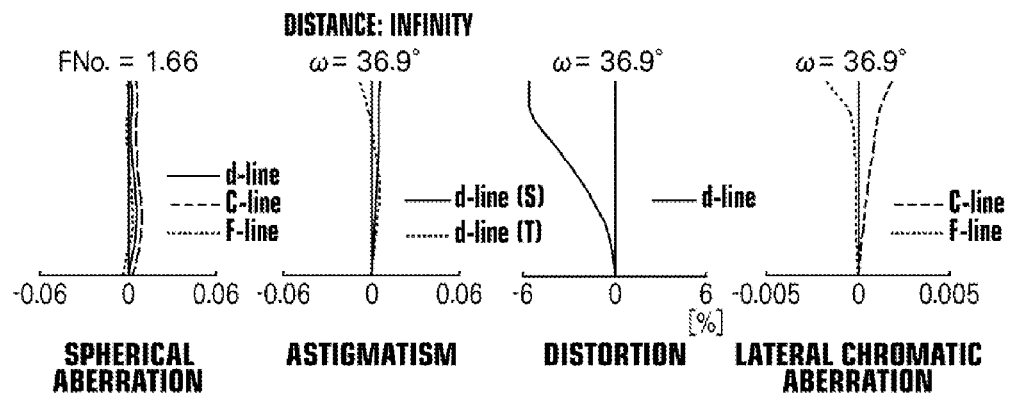
FIG. 12 illustrates aberration diagrams of the imaging lens of Example 5 described above.
Figure 12:
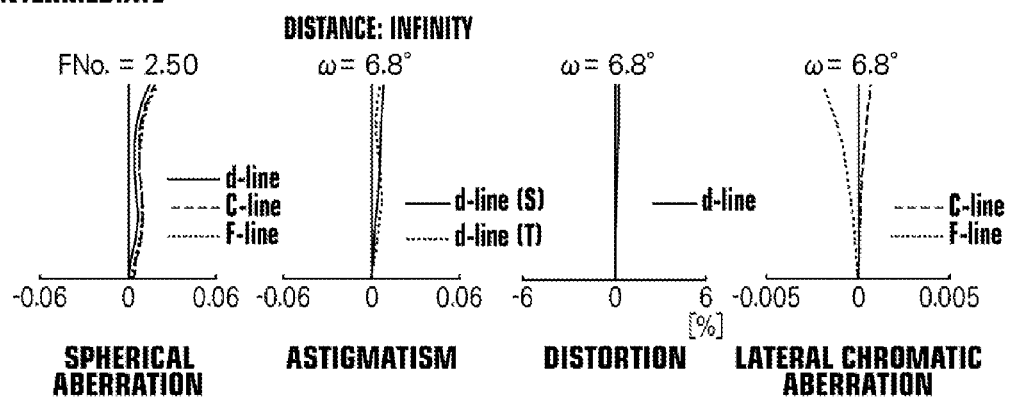
Figure 12:
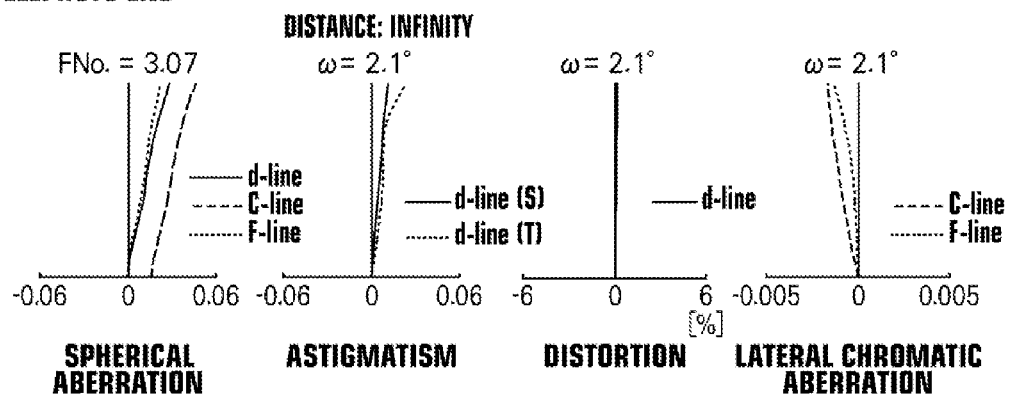

Tables 13, 14 and 15 respectively show basic lens data, data related to specs and changes in magnification/focusing, and aspherical surface coefficients of the zoom lens of Example 5. FIG. 12 shows the respective aberration diagrams of the zoom lens of Example 5.

TABLE 13

Example 5/Lens Data

| Si (Surface Numbers) | Ri (Radii of Curvature) | Di (Distances Between Surfaces) | ndj (Refractive Indices) | vdj (Abbe Numbers) |
|---|---|---|---|---|
| 1 | 47.3985 | 0.52 | 1.80518 | 25.42 |
| 2 | 13.0658 | 2.24 | 1.49700 | 81.54 |
| 3 | −103.1687 | 0.02 | | |
| 4 | 23.0443 | 1.06 | 1.49700 | 81.54 |
| 5 | ∞ | 0.02 | | |
| 6 | 9.6669 | 1.23 | 1.80400 | 46.58 |
| 7 | 25.8783 | DD[7] | | |
| 8 | 14.3518 | 0.19 | 1.88300 | 40.76 |
| 9 | 1.8489 | 1.08 | | |
| 10 | −6.1515 | 0.17 | 1.88300 | 40.76 |
| 11 | 8.4209 | 0.02 | | |
| 12 | 4.0719 | 1.02 | 1.84661 | 23.78 |
| 13 | −4.0719 | 0.18 | 1.83481 | 42.73 |
| 14 | 29.4407 | DD[14] | | |
| 15(Stop) | ∞ | 0.52 | | |
| 16 | ∞ | 1.06 | 1.80809 | 22.76 |
| 17 | −2.9547 | 0.46 | 1.83481 | 42.73 |
| 18 | 6.1645 | 0.12 | | |
| *19 | 5.5355 | 1.02 | 1.58313 | 59.46 |
| *20 | −29.4665 | 0.35 | | |
| 21 | 6.5607 | 0.21 | 1.85026 | 32.27 |
| 22 | 3.7333 | 1.24 | 1.51823 | 58.90 |
| 23 | −10.7349 | 0.35 | | |
| 24 | −11.0626 | 0.47 | 1.90366 | 31.32 |
| 25 | −116.1853 | DD[25] | | |
| 26 | 14.5581 | 1.19 | 1.48749 | 70.23 |
| 27 | −4.4248 | 0.22 | 1.92286 | 20.88 |
| 28 | −8.8263 | 0.12 | | |
| *29 | 7.4027 | 1.46 | 1.58313 | 59.46 |
| *30 | −5.4781 | DD[30] | | |
| 31 | −6.3354 | 0.23 | 1.83481 | 42.73 |
| 32 | 6.3354 | 1.30 | 1.61293 | 37.00 |
| 33 | −4.7675 | 2.39 | | |
| 34 | ∞ | 4.92 | 1.70155 | 41.10 |
| 35 | ∞ | 1.58 | 1.51632 | 64.00 |
| 36 | ∞ | 0.01 | | |

TABLE 14

Example 5/Specs (d-line)

| | Wide | Intermediate | Telephoto |
|---|---|---|---|
| Zoom Ratios | 1.0 | 5.9 | 19.5 |
| f' | 1.00 | 5.94 | 19.51 |
| Bf' | 6.34 | 6.34 | 6.34 |
| FNo. | 1.66 | 2.50 | 3.07 |
| 2ω[°] | 73.8 | 13.6 | 4.2 |
| DD[7] | 0.21 | 7.21 | 9.49 |
| DD[14] | 9.72 | 2.72 | 0.44 |

TABLE 14-continued

Example 5/Specs (d-line)

| | Wide | Intermediate | Telephoto |
|---|---|---|---|
| DD[25] | 2.10 | 0.98 | 1.44 |
| DD[30] | 0.36 | 1.48 | 1.02 |

TABLE 15

Example 5/Aspherical Surface Coefficients

| Surface Number | 19 | 20 |
|---|---|---|
| KA | −9.4426953E+00 | −1.4511685E−01 |
| A3 | 4.8460167E−08 | −7.9453365E−07 |
| A4 | 7.7034108E−03 | −1.2117326E−04 |
| A5 | 6.7527932E−06 | 9.6892585E−04 |
| A6 | −5.2422972E−04 | −3.1309167E−03 |
| A7 | −4.7376882E−04 | 5.3985799E−03 |
| A8 | 1.5389688E−04 | −5.3448432E−03 |
| A9 | 2.4329643E−04 | 2.9236393E−03 |
| A10 | −2.0141894E−04 | −6.6454325E−04 |
| A11 | 4.4337755E−05 | −4.9785063E−05 |
| A12 | 4.8302772E−05 | −3.3958655E−05 |
| A13 | −5.8350259E−05 | 8.8759532E−05 |
| A14 | 2.8899233E−05 | −4.1469155E−05 |
| A15 | −7.0672907E−06 | 7.9790500E−06 |
| A16 | 6.9986406E−07 | −5.4817106E−07 |

| Surface Number | 29 | 30 |
|---|---|---|
| KA | −2.4189677E+00 | −1.4827650E+00 |
| A3 | 1.0371396E−07 | 6.7539606E−08 |
| A4 | −2.3512464E−04 | 2.5933557E−04 |
| A5 | 1.2142281E−03 | 4.2723711E−05 |
| A6 | −8.4563489E−04 | −5.4785640E−06 |
| A7 | 6.7503762E−05 | 9.6153722E−06 |
| A8 | 1.7498575E−04 | −8.3475045E−06 |
| A9 | −3.0378715E−05 | 5.5453258E−06 |
| A10 | −4.1541680E−05 | −2.7479561E−06 |
| A11 | 2.0122319E−05 | 1.1437219E−06 |
| A12 | −3.1687705E−06 | −4.4551937E−07 |
| A13 | 6.2972081E−07 | 1.5278838E−07 |
| A14 | −3.4835154E−07 | −3.8250277E−08 |
| A15 | 8.4777191E−08 | 5.7428089E−09 |
| A16 | −6.9521803E−09 | −3.7904178E−10 |

EXAMPLE 6

Figure 7:
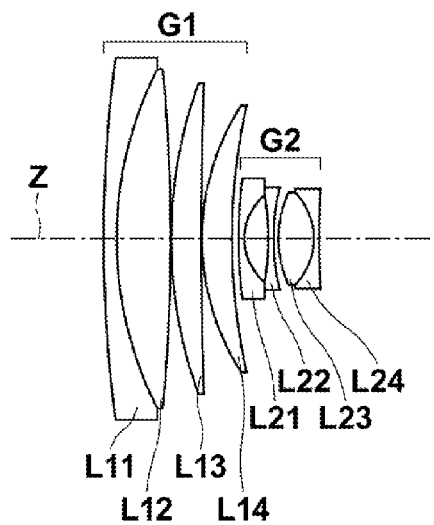
FIG. 7 is a cross-sectional view illustrating the lens configuration of an imaging lens of Example 6 of the present invention.
Figure 7:
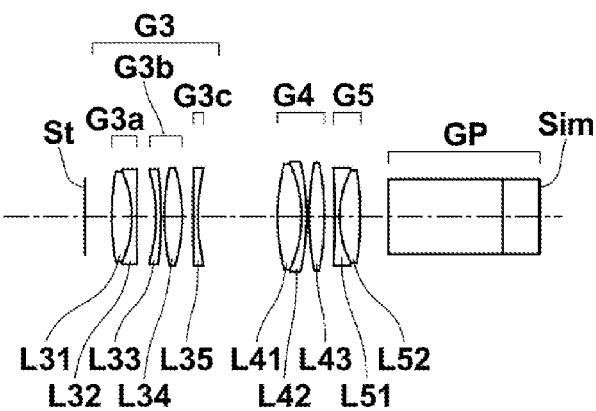
Figure 7:
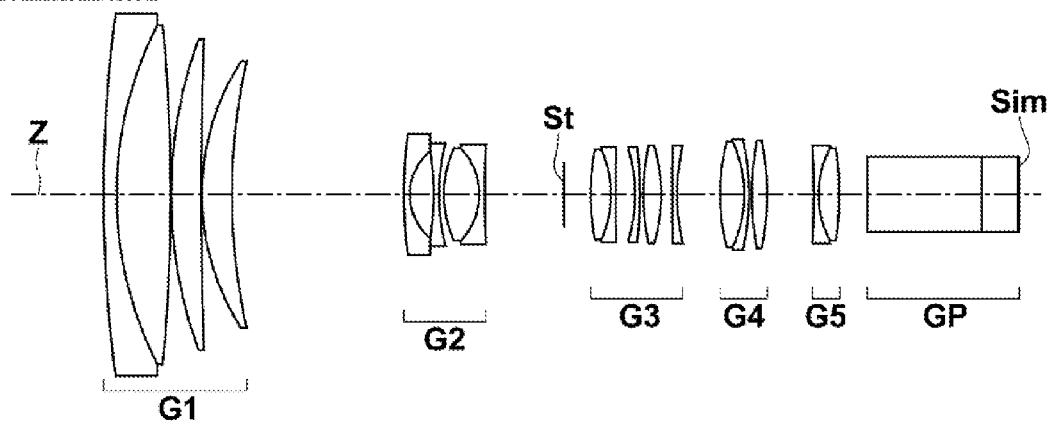
Figure 7:
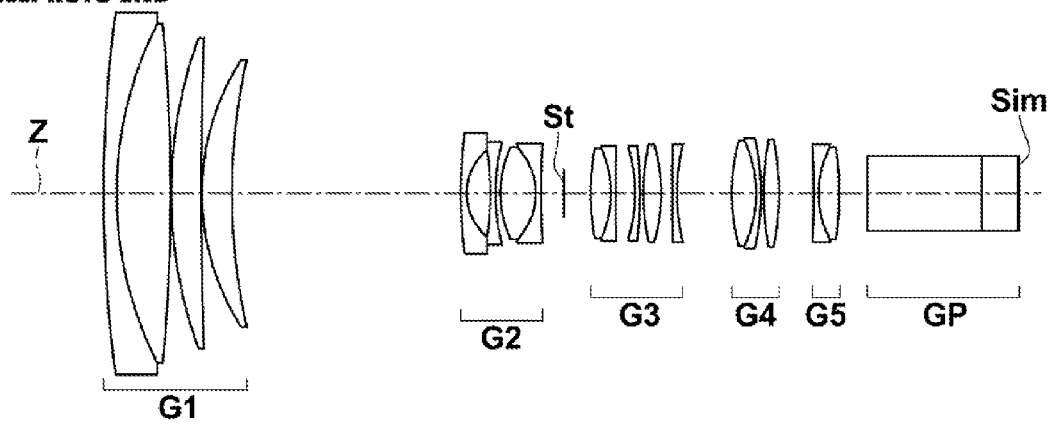

FIG. 7 shows the lens configuration of the zoom lens of Example 6. The schematic configuration of the zoom lens of Example 6 is substantially the same as that of the zoom lens of Example 1 described above, except for the configuration of the third lens group G3.

That is, in the zoom lens of Example 1, the third-a lens group G3a is constituted by three lenses, i.e., the 31 lens L31, the 32 lens L32 and the 33 lens L33, whereas in the zoom lens of Example 6, the third-a lens group G3a is constituted by two lenses, i.e., the 31 lens L31 and the 32 lens L32. The 31 lens L31 and the 32 lens L32 are cemented to each other. Therefore, the joint surface formed by these lenses enables correcting longitudinal chromatic aberration.

Further, in the zoom lens of Example 6, the third-b lens group G3b is constituted by the 33 lens L33 which is a negative meniscus lens with a concave surface toward the object side and the 34 lens L34 which is a positive lens in this order from the object side. The 34 lens L34 is formed by the medium, the Abbe number of which is larger than that of the 33 lens L33. Note that more particularly, as shown in Table 16 to be described later, the Abbe number of the 33 lens L33 is 34.47, whereas the Abbe number of the 34 lens L34 is 59.46.

Configuring the third-b lens group G3b, which moves in a direction that intersects the optical axis Z when correcting camera shake, in such a manner as described above can preferably suppress the fluctuations in various aberrations when correcting camera shake.

Further, in the zoom lens of Example 6, the third-b lens group G3c is constituted by the 35 lens L35 which is a negative meniscus lens with a concave surface toward the image side.

Figure 13:
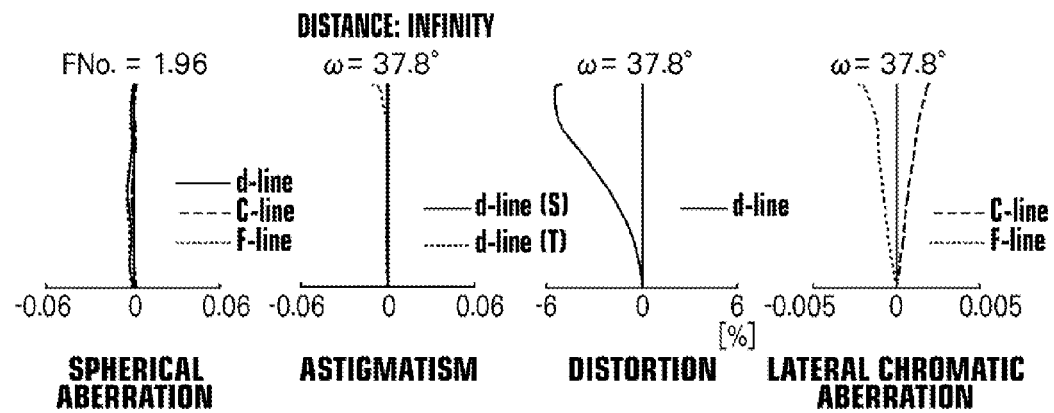
FIG. 13 illustrates aberration diagrams of the imaging lens of Example 6 described above.
Figure 13:
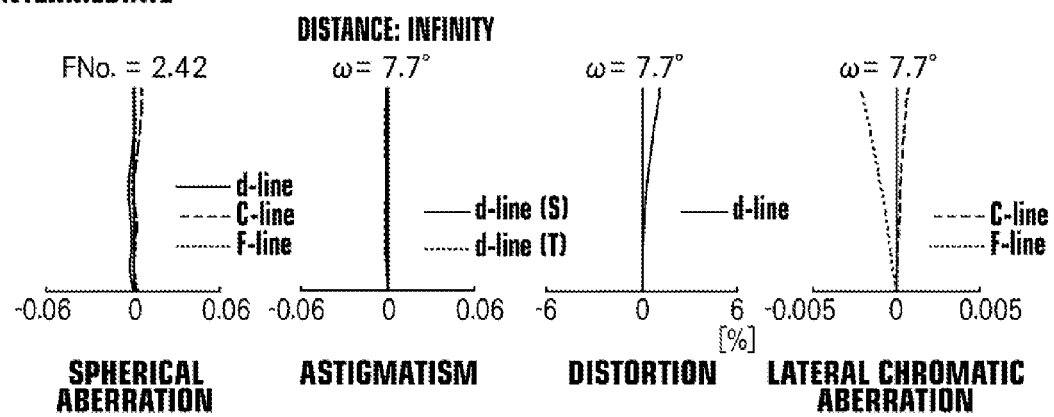
Figure 13:
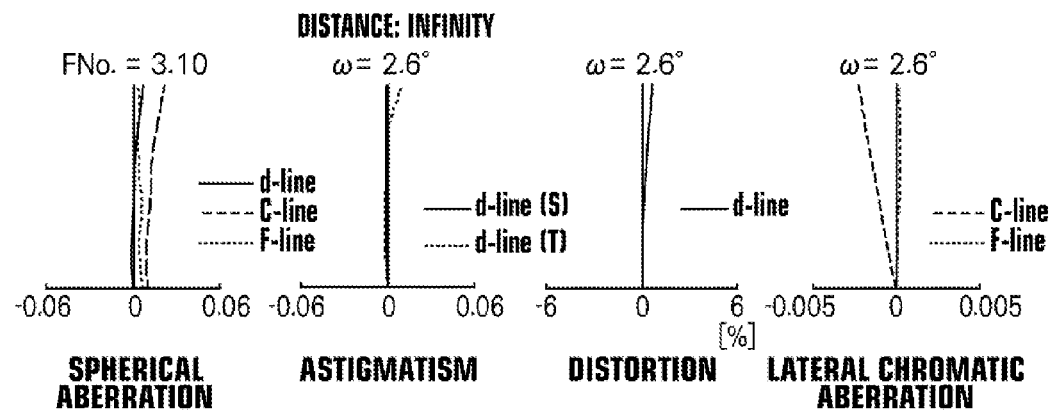

Tables 16, 17 and 18 respectively show basic lens data, data related to specs and changes in magnification/focusing, and aspherical surface coefficients of the zoom lens of Example 6. Note that in this Example 6, the aspherical surface coefficient Am in the aspherical surface formula described above takes the values (m=3, 4, 5, . . . 20). FIG. 13 shows the respective aberration diagrams of the zoom lens of Example 6.

TABLE 16

Example 6/Lens Data

| Si (Surface Numbers) | Ri (Radii of Curvature) | Di (Distances Between Surfaces) | ndj (Refractive Indices) | νdj (Abbe Numbers) |
|---|---|---|---|---|
| 1 | 46.6533 | 0.43 | 1.80518 | 25.42 |
| 2 | 12.7070 | 1.79 | 1.49700 | 81.54 |
| 3 | −61.8851 | 0.02 | | |
| 4 | 15.5377 | 1.00 | 1.49700 | 81.54 |
| 5 | 172.2196 | 0.02 | | |
| 6 | 8.4167 | 0.99 | 1.80400 | 46.58 |
| 7 | 20.8615 | DD[7] | | |
| 8 | 16.7927 | 0.19 | 2.00100 | 29.13 |
| 9 | 1.9101 | 0.79 | | |
| 10 | −9.1420 | 0.18 | 2.00100 | 29.13 |
| 11 | 7.1243 | 0.16 | | |
| 12 | 3.7179 | 1.17 | 1.80809 | 22.76 |
| 13 | −2.2616 | 0.18 | 1.88300 | 40.76 |
| 14 | 30.7448 | DD[14] | | |
| 15(Stop) | ∞ | 0.89 | | |
| 16 | 8.4219 | 0.67 | 1.80809 | 22.76 |
| 17 | −3.7026 | 0.16 | 1.91082 | 35.25 |
| 18 | 116.8565 | 0.64 | | |
| 19 | −5.2669 | 0.16 | 1.63980 | 34.47 |
| 20 | −14.7788 | 0.12 | | |
| *21 | 8.1884 | 0.59 | 1.58313 | 59.46 |
| *22 | −5.4223 | 0.36 | | |
| 23 | 102.1949 | 0.16 | 1.95906 | 17.47 |
| 24 | 7.1814 | DD[24] | | |
| 25 | 7.0589 | 0.80 | 1.59282 | 68.62 |
| 26 | −4.2800 | 0.16 | 1.95375 | 32.32 |
| 27 | −8.7545 | 0.09 | | |
| *28 | 9.3534 | 0.51 | 1.58313 | 59.46 |
| *29 | −8.9692 | DD[29] | | |
| 30 | −27.8336 | 0.16 | 2.00100 | 29.13 |
| 31 | 3.4229 | 0.68 | 1.80000 | 29.84 |
| 32 | −11.6626 | 0.93 | | |
| 33 | ∞ | 1.30 | 1.51633 | 64.14 |
| 34 | ∞ | 4.14 | 1.60342 | 38.03 |
| 35 | ∞ | | | |

TABLE 17

Examples 6/Specs (d-line)

| | Wide | Intermediate | Telephoto |
|---|---|---|---|
| Zoom Ratios | 1.0 | 5.4 | 16.4 |
| f | 1.00 | 5.36 | 16.42 |
| Bf | 4.70 | 4.70 | 4.70 |
| FNo. | 1.96 | 2.42 | 3.10 |
| 2ω[°] | 75.6 | 15.4 | 5.2 |
| DD[7] | 0.22 | 5.70 | 7.58 |
| DD[14] | 8.11 | 2.63 | 0.75 |
| DD[24] | 2.63 | 1.42 | 1.82 |
| DD[29] | 0.34 | 1.55 | 1.15 |

TABLE 18

Example 6/Spherical Surface Coefficients

| Surface Number | 21 | 22 |
|---|---|---|
| KA | −8.1446274E−02 | −2.6259744E+00 |
| A3 | −3.7414589E−05 | −1.6379415E−04 |
| A4 | 6.9466365E−03 | 4.5673982E−03 |
| A5 | −2.7665709E−02 | −1.8911256E−02 |
| A6 | 2.8001635E−02 | 3.2892284E−02 |
| A7 | 1.8828571E−02 | −6.2516488E−02 |
| A8 | −4.7625939E−02 | 1.1758280E−01 |
| A9 | 7.8475381E−03 | −1.1576431E−01 |
| A10 | 2.6038170E−02 | 1.3821414E−02 |
| A11 | −1.0444674E−02 | 6.2433525E−02 |
| A12 | −5.7171109E−03 | −4.3165139E−02 |
| A13 | 2.9564117E−04 | 8.0494608E−03 |
| A14 | 4.8333013E−03 | 6.6243254E−04 |
| A15 | −1.1894426E−03 | −2.9766993E−03 |
| A16 | −1.2789976E−03 | 2.4432497E−03 |
| A17 | −4.8903980E−04 | 1.8807987E−03 |
| A18 | 1.4963817E−03 | −3.1680720E−03 |
| A19 | −7.3339792E−04 | 1.4165056E−03 |
| A20 | 1.1513801E−04 | −2.1724401E−04 |

| Surface Number | 28 | 29 |
|---|---|---|
| KA | −5.0786853E+01 | −1.8732401E+00 |
| A3 | 4.4460876E−05 | 4.9815364E−07 |
| A4 | 5.2346044E−03 | −1.6489111E−03 |
| A5 | 4.2321060E−03 | 3.1524580E−03 |
| A6 | −7.3091134E−03 | 9.7204921E−04 |
| A7 | 1.1436289E−02 | −3.3195851E−03 |
| A8 | −1.7834948E−02 | −2.5435681E−03 |
| A9 | 8.9752848E−03 | 4.8232902E−03 |
| A10 | 3.4816087E−03 | −1.6394516E−03 |
| A11 | 4.9415646E−06 | 7.7927502E−04 |
| A12 | −4.9839068E−03 | −4.4818160E−04 |
| A13 | −9.4404739E−05 | −6.8141096E−04 |
| A14 | 2.8420702E−03 | 2.6211922E−04 |
| A15 | 1.1211471E−03 | 6.0196360E−04 |
| A16 | −3.2776619E−03 | −5.5497359E−04 |
| A17 | 1.6325578E−03 | 2.2937687E−04 |
| A18 | −1.1574334E−04 | −7.8494733E−05 |
| A19 | −1.2068112E−04 | 2.3745724E−05 |
| A20 | 2.6292862E−05 | −3.4508759E−06 |

Table 19 shows a collection of the conditions (the equations), the numerical ranges of which are respectively defined by conditional formulas (1) through (7), for each of the Examples 1 through 6.

TABLE 19

| Expression Numbers | Conditional Formulas | Example 1 | Example 2 | Example 3 | Example 4 | Example 5 | Example 6 |
|---|---|---|---|---|---|---|---|
| (1) | $0.05 < Y/Bf < 0.20$ | 0.11 | 0.11 | 0.11 | 0.11 | 0.11 | 0.16 |
| (2) | $1.8 < Lsr/Bf < 3.5$ | 2.01 | 2.02 | 2.02 | 2.04 | 2.02 | 1.94 |
| (3) | $2.0 < |f12w/fw| < 4.0$ | 2.80 | 2.98 | 2.67 | 2.75 | 2.66 | 2.35 |
| (4) | $5.8 < |f1/f2| < 8.0$ | 6.68 | 6.29 | 6.85 | 6.61 | 6.88 | 6.62 |
| (5) | $7.0 < |Mz/fw| < 11.0$ | 9.82 | 9.79 | 9.29 | 9.37 | 9.29 | 7.35 |
| (6) | $10.0 < Lfs/fw < 25.0$ | 18.1 | 18.0 | 17.7 | 17.7 | 17.7 | 15.23 |
| (7) | $2.0 < |(Rz1 + Rz2)/(Rz1 - Rz2)| < 4.5$ | 3.44 | 3.63 | 2.91 | 3.05 | 2.87 | 3.18 |

It can be understood from the data described above that the zoom lens of each of the Examples 1 through 6 can reduce the fluctuations in chromatic aberration and achieve miniaturization while securing a high zoom ratio of approximately 20× and sufficient amount of back focus.

Figure 14:
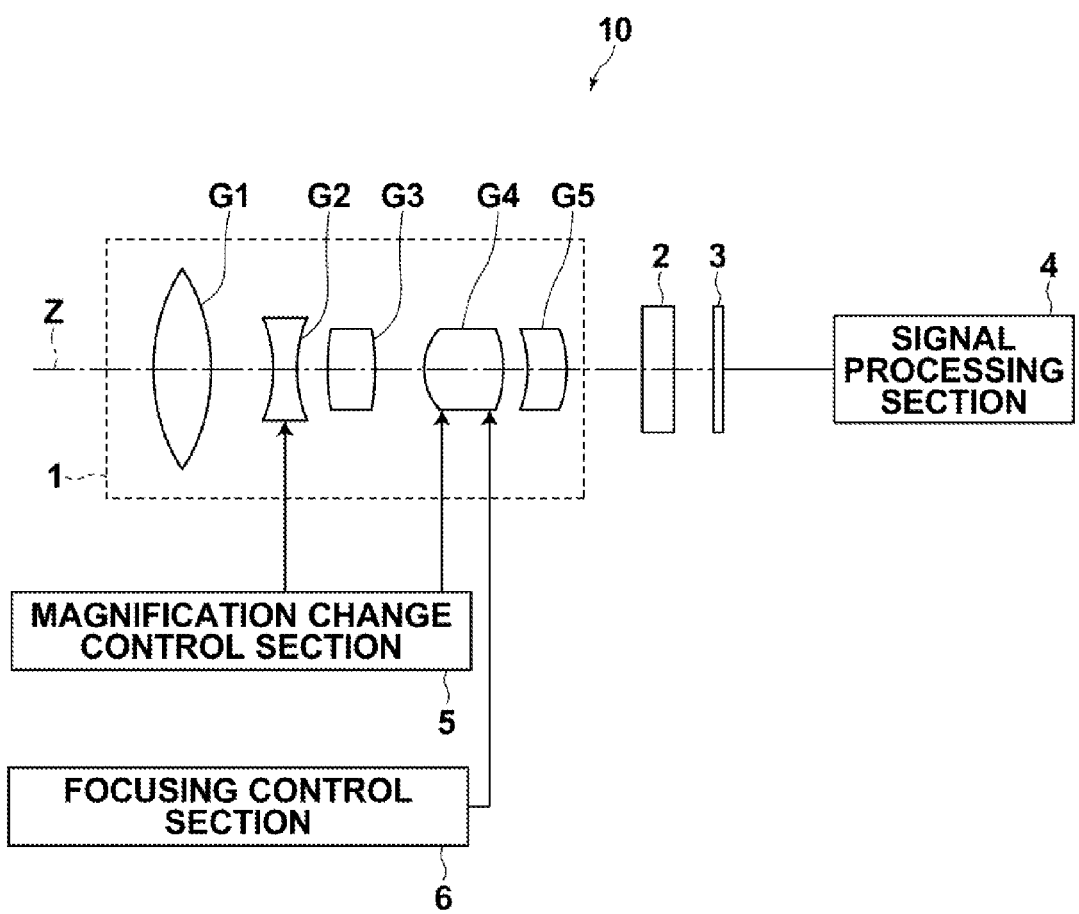
FIG. 14 is a schematic configuration of an imaging apparatus according to one embodiment of the present invention.

Next, an imaging apparatus according to the embodiment of the present invention will be described referring to FIG. 14. FIG. 14 shows the schematic configuration of the imaging apparatus 10 according to one embodiment of the present invention. The examples of this imaging apparatus 10 includes a film camera, an electronic camera such as a digital camera, a video camera, a broadcasting camera, a movie camera, a surveillance camera and the like, for example.

The imaging apparatus 10 shown in FIG. 14 is equipped with the zoom lens 1 according to the embodiment of the present invention; a filter 2, which is disposed on the image side of the zoom lens 1; an image sensor 3 which captures an image of a subject formed by the zoom lens; a signal processing section 4 which computes a signal output from the image sensor 3; a magnification change control section 5, and a focusing control section 6. Note that for example, elements constituted by the optical member GP in FIG. 2 described above, and the like may be applied as the filter 2.

The zoom lens 1 is constituted by a first lens group G1 having a positive refractive power, a second lens group G2 having a negative refractive power, a third lens group G3, a fourth lens group G4 having a positive refractive power, and a fifth lens group G5 in this order from the object side along the optical axis Z. Note that FIG. 14 schematically illustrates each lens group.

The image sensor 3 captures an image of a subject formed by the zoom lens 1 and converts the image into an electric signal. The image sensor 3 is disposed such that the imaging surface thereof matches the imaging plane of the zoom lens. A CCD (Charge Coupled Device), a CMOS (Complementary Metal Oxide Semiconductor) or the like may be employed as the image sensor 3, for example. The magnification change control section 5 moves the second lens group G2 in the direction of the optical axis to change magnification, and moves the fourth lens group G4 in the direction of the optical axis to correct the variations in the imaging plane due to the changes in magnification. The focusing control section 6 is configured to move the fourth lens group G4 in the direction of the optical axis to perform focusing when the object distance is changed.

Note that in the zoom lens 1 applied herein as well, a lens group for correcting camera shake which moves in the direction that intersects the optical axis Z can be provided at a part of the third lens group G3 as necessary.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers, the aspherical surface coefficients and the like of each lens are not limited to the values shown in each of the Numerical Examples above, but may be other values.

What is claimed is:

1. A zoom lens consisting essentially of a first lens group having a positive refractive power, a second lens group having a negative refractive power, an aperture stop, a third lens group, a fourth lens group having a positive refractive power, and a fifth lens group in this order from the object side, wherein the first, third, and fifth lens groups are fixed while the second and fourth lens groups move when changing magnification;

the fourth lens group moves when focusing;

the fifth lens group consists essentially only of a single cemented lens which has a meniscus shape with a convex surface toward the image side;

the refractive index of a medium which constitutes the object-side lens of the cemented lens is greater than that of the image-side lens of the cemented lens; and the zoom lens satisfies conditional formulas (1) and (2) below:

$$0.05 < Y/Bf < 0.20 \quad (1)$$

$$1.8 < Lsr/Bf < 3.5 \quad (2),\text{ where}$$

Y: the maximum image height,
Bf: the air equivalent back focus, and
Lsr: the distance along the optical axis from the aperture stop to the peak of the most-image-side lens surface.

2. The zoom lens of claim 1 that satisfies conditional formulas (1') or (2') below:

$$0.08 < Y/Bf < 0.18 \quad (1')$$

$$1.9 < Lsr/Bf < 3.0 \quad (2').$$

3. The zoom lens of claim 1 that satisfies conditional formula (3) below:

$$2.0 < |f12w/fw| < 4.0 \quad (3),\text{ where}$$

f12w: the combined focal length of the first lens group and the second lens group at the wide angle end, and
fw: the focal length of the entire system at the wide angle end.

4. The zoom lens of claim 3 that satisfies conditional formula (3') below:

$$2.2 < |f12w/fw| < 3.5 \quad (3').$$

5. The zoom lens claim 1 that satisfies conditional formula (4) below:

$$5.8 < |f1/f2| < 8.0 \quad (4),\text{ where}$$

f1: the focal length of the first lens group, and
F2: the focal length of the second lens group.

6. The zoom lens of claim 5 that satisfies conditional formula (4') below:

$$6.0 < |f1/f2| < 7.0 \quad (4').$$

7. The zoom lens of claim 1, wherein the first, second, and third lens groups have a negative refractive power as a whole.

8. The zoom lens of claim 1 that satisfies conditional formula (5) below:

$$7:0 < Mz/fw < 11.0 \quad (5),\text{ where}$$

Mz: the amount of movement of the second lens group when changing magnification from the wide angle end to the telephoto end, and
fw: the focal length of the entire system at the wide angle end.

9. The zoom lens of claim 1 that satisfies conditional formula (6) below:

$$10.0 < Lfs/fw < 25.0 \quad (6),\text{ where}$$

Lfs: the distance along the optical axis from the peak of the most-object-side lens surface to the aperture stop, and
fw: the focal length of the entire system at the wide angle end.

10. The zoom lens of claim 9 that satisfies conditional formula (6') below:

$$15.0 < Lfs/fw < 20.0 \quad (6').$$

11. The zoom lens of claim 1, wherein the air space formed by a convex surface and a concave surface facing each other and a joint surface are provided within the interior of the second lens group; and the zoom lens satisfies conditional formula (7) below:

$$2.0 < |(Rz1+Rz2)/(Rz1-Rz2)| < 4.5 \quad (7),\text{ where}$$

Rz1, Rz2: the respective radii of curvature of one and the other of the convex surface and the concave surface.

12. The zoom lens of claim 11 that satisfies conditional formula (7') below:

$$2.5 < |(Rz1+Rz2)/(Rz1-Rz2)| < 4.0 \quad (7').$$

13. The zoom lens of claim 1, wherein the first lens group consists essentially of a lens having a negative refractive power, a lens having a positive refractive power which is cemented to this negative lens together, another lens having a positive refractive power, and still another lens having a positive refractive power in this order from the object side.

14. The zoom lens of claim 1, wherein the third lens group consists essentially of a third-a lens group, which is fixed when correcting camera shake; a third-b lens group having a positive refractive power, which is capable of shifting an image on the image formation plane by moving in a direction that intersects the optical axis when correcting camera shake; and a third-c lens group having a negative refractive power, which is fixed when correcting camera shake in this order from the object side.

15. The zoom lens of claim 14, wherein the third-a lens group includes a cemented lens.

16. The zoom lens of claim 14, wherein the third-b lens group consists essentially of a cemented lens formed by cementing a lens having a positive refractive power and a lens having a negative refractive power; and the Abbe number of the medium of the lens having a positive refractive power is greater than that of the medium of the lens having a negative refractive power.

17. The zoom lens of claim 14, wherein the third-b lens group consists essentially of a meniscus lens having a negative refractive power with a concave surface toward the object side and a lens having a positive refractive power in this order from the object side; and the Abbe number of the medium of the lens having a positive refractive power is greater than that of the medium of the lens having a negative refractive power.

18. The zoom lens of claim 1, wherein the fourth lens group includes a cemented lens formed by cementing a lens having a positive refractive power and a lens having a negative refractive power together; and the Abbe number of the medium of the lens having a positive refractive power is greater than that of the medium of the lens having a negative refractive power.

19. The zoom lens of claim 18, wherein the fourth lens group consists essentially of a lens having a positive refractive power; a lens having a negative refractive power, which is cemented to this lens together, and a lens having a positive refractive power and including an aspherical surface in this order from the object side.

20. An imaging apparatus comprising:
the zoom lens of claim 1.

* * * * *